(12) United States Patent
Kamihara et al.

(10) Patent No.: US 6,901,465 B2
(45) Date of Patent: May 31, 2005

(54) DATA TRANSFER CONTROL DEVICE, ELECTRONIC EQUIPMENT, AND DATA TRANSFER CONTROL METHOD

(75) Inventors: Yoshiyuki Kamihara, Sapporo (JP); Takuya Ishida, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 417 days.

(21) Appl. No.: 10/133,751

(22) Filed: Apr. 29, 2002

(65) Prior Publication Data

US 2002/0169904 A1 Nov. 14, 2002

(30) Foreign Application Priority Data

May 14, 2001 (JP) ........................................ 2001-143431

(51) Int. Cl.[7] .............................................. G06F 13/00
(52) U.S. Cl. ........................... 710/100; 710/52; 710/53; 710/310; 710/402; 370/402
(58) Field of Search ........................... 710/52, 53, 310, 710/100; 370/402

(56) References Cited

U.S. PATENT DOCUMENTS

| | | | | |
|---|---|---|---|---|
| 5,131,081 A | * | 7/1992 | MacKenna et al. | ............ 710/22 |
| 5,566,306 A | * | 10/1996 | Ishida | ............ 710/309 |
| 5,771,359 A | * | 6/1998 | Galloway et al. | ............ 710/310 |
| 5,958,032 A | * | 9/1999 | Manabe | ............ 710/310 |
| 5,987,554 A | * | 11/1999 | Liu et al. | ............ 710/310 |
| 6,021,451 A | * | 2/2000 | Bell et al. | ............ 710/309 |
| 6,073,190 A | * | 6/2000 | Rooney | ............ 710/56 |

(Continued)

FOREIGN PATENT DOCUMENTS

| | | | | |
|---|---|---|---|---|
| JP | 411341058 A | * | 12/1999 | ............ H04L/12/56 |
| JP | 2000134229 A | * | 5/2000 | ............ H04L/12/40 |
| JP | 2000134230 A | * | 5/2000 | ............ H04L/12/40 |
| KR | 1999-0067763 | | 8/1999 | |
| WO | WO 99/63448 | | 12/1999 | |

OTHER PUBLICATIONS

Mitsubishi Digital ASSP M66290A USB Application Note, Ver. 1.0, *Mitsubishi Electric Corporation*, XP–002234426 pp. 1–59, Nov. 20, 2000.
U.S. Appl. No. 10/140,834, filed May 9, 2002, Ishida et al.
U.S. Appl. No. 10/140,829, filed May 9, 2002, Ishida et al.
Universal Serial Bus Mass Storage Class—Bulk–Only Transport Rev. 1.0/Sep. 31, 1999.

(Continued)

*Primary Examiner*—Mark H. Rinehart
*Assistant Examiner*—Donna K. Mason
(74) *Attorney, Agent, or Firm*—Oliff & Berridge, PLC

(57) ABSTRACT

A data transfer control device using USB (a first bus), the end of a data phase (data transport: transfer of all the data) during an OUT transaction is determined on condition that data transmission (DMA transfer) through EBUS (a second bus) has ended, and the end of a data phase during an IN transaction is determined on condition that data reception through EBUS has ended and also an Empty signal has gone active, indicating that a data storage area has become empty. A counter that counts the data size is provided on the EBUS side. If data reception through EBUS ends and the size of data remaining in the data storage area is less than the maximum packet size, a short packet in the data storage area is transmitted automatically through USB and an interrupt is used to notify the firmware of the presence of the short packet.

23 Claims, 20 Drawing Sheets

U.S. PATENT DOCUMENTS

| | | | |
|---|---|---|---|
| 6,128,673 A | 10/2000 | Aronson et al. | |
| 6,161,160 A * | 12/2000 | Niu et al. | 710/310 |
| 6,185,641 B1 | 2/2001 | Dunnihoo | |
| 6,219,737 B1 * | 4/2001 | Chen et al. | 710/310 |
| 6,256,699 B1 * | 7/2001 | Lee | 710/310 |
| 6,279,087 B1 * | 8/2001 | Melo et al. | 711/146 |
| 6,289,406 B1 * | 9/2001 | Chambers et al. | 710/107 |
| 6,356,972 B1 * | 3/2002 | Chin et al. | 710/310 |
| 6,385,194 B2 * | 5/2002 | Surprenant et al. | 370/353 |
| 6,405,276 B1 * | 6/2002 | Chen et al. | 710/310 |
| 6,460,108 B1 * | 10/2002 | McCoskey et al. | 710/310 |
| 6,529,521 B1 * | 3/2003 | MacArthur | 370/463 |
| 6,678,760 B2 | 1/2004 | Brief | |
| 6,684,272 B1 * | 1/2004 | Leete et al. | 710/52 |
| 6,711,181 B1 * | 3/2004 | Xue et al. | 370/504 |
| 6,807,585 B2 * | 10/2004 | Kovacevic | 710/5 |
| 2003/0046475 A1 * | 3/2003 | Black et al. | 710/310 |
| 2003/0112811 A1 * | 6/2003 | Hadi Salim | 370/401 |

OTHER PUBLICATIONS

Universal Serial Bus Mass Storage Class Specification Overview Rev. 1.1/Jun. 28, 2000.

Mitsubishi Digital ASSP M66290A USB Application Note, Ver. 1.0, *Mitsubishi Electric Corporation*, XP–002234426 pp. 1–59, Nov. 20, 2000.

* cited by examiner

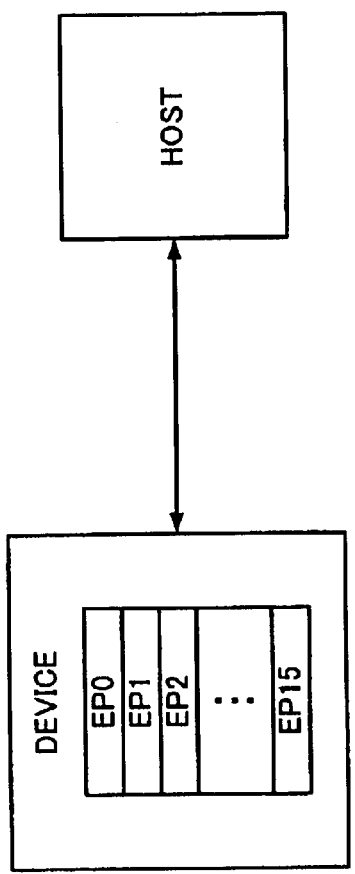
FIG. 1A
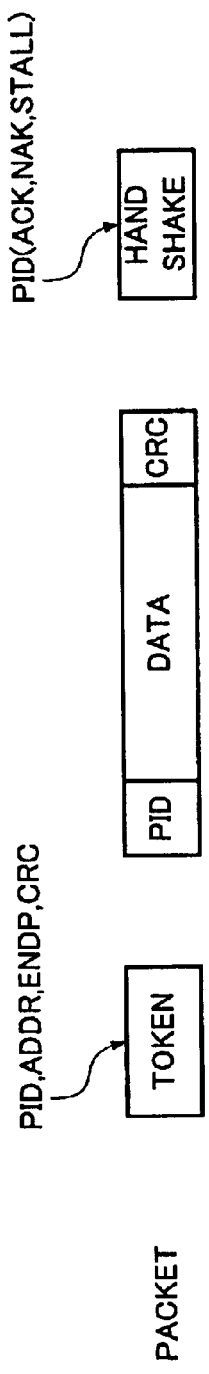
FIG. 1B
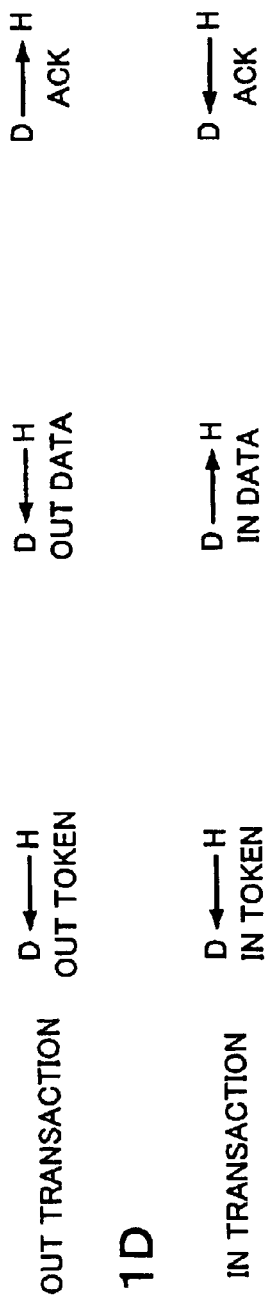
FIG. 1C
FIG. 1D

FIG. 2A  CBI

| | |
|---|---|
| EP0 (CONTROL) | CONTROL, COMMAND |
| EP1 (BULK-OUT) | OUT DATA |
| EP2 (BULK-IN) | IN DATA |
| EP3 (INTERRUPT) | INTERRUPT IN |

FIG. 2B  Bulk-Only

| | |
|---|---|
| EP0 (CONTROL) | CONTROL |
| EP1 (BULK-OUT) | A1  A2<br>COMMAND (CBW), OUT DATA |
| EP2 (BULK-IN) | A3  A4<br>STATUS (CSW), IN DATA |

FIG. 3

| BIT BYTE | 7 | 6 | 5 | 4 | 3 | 2 | 1 | 0 |
|---|---|---|---|---|---|---|---|---|
| 0~3 | dCBWSignature |||||||||
| 4~7 | dCBWTag |||||||||
| 8~11 | dCBWDataTransferLength |||||||||
| 12 | bmCBWFlags |||||||||
| 13 | RESERVED(0) |||| bCBWLUN ||||
| 14 | RESERVED(0) ||| bCBWCBLength |||||
| 15~30 | CBWCB |||||||||

CBW

FIG. 4

| BIT<br>BYTE | 7 | 6 | 5 | 4 | 3 | 2 | 1 | 0 |
|---|---|---|---|---|---|---|---|---|
| 0~3 | \multicolumn{8}{c}{dCSWSignature} | | | | | | | |
| 4~7 | dCSWTag | | | | | | | |
| 8~11 | dCSWDataResidue | | | | | | | |
| 12 | bCSWStatus | | | | | | | |

CSW

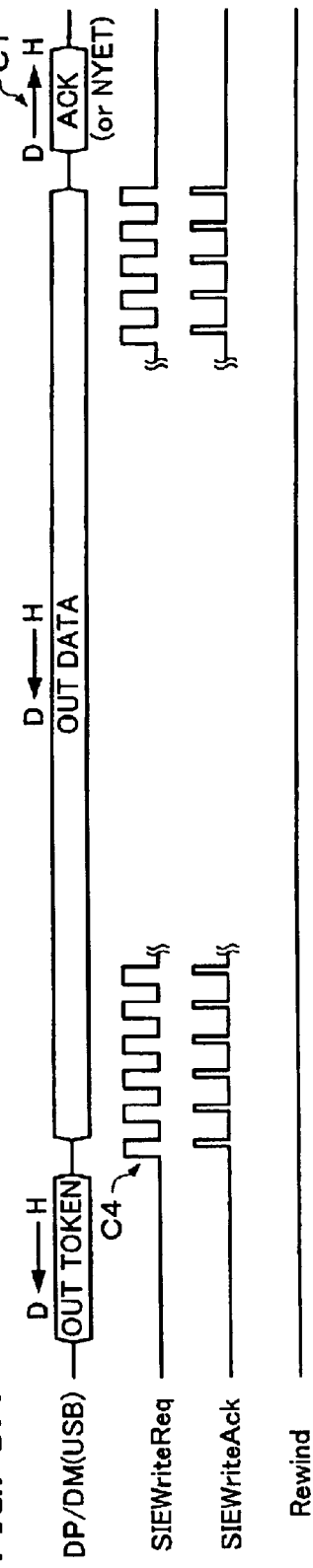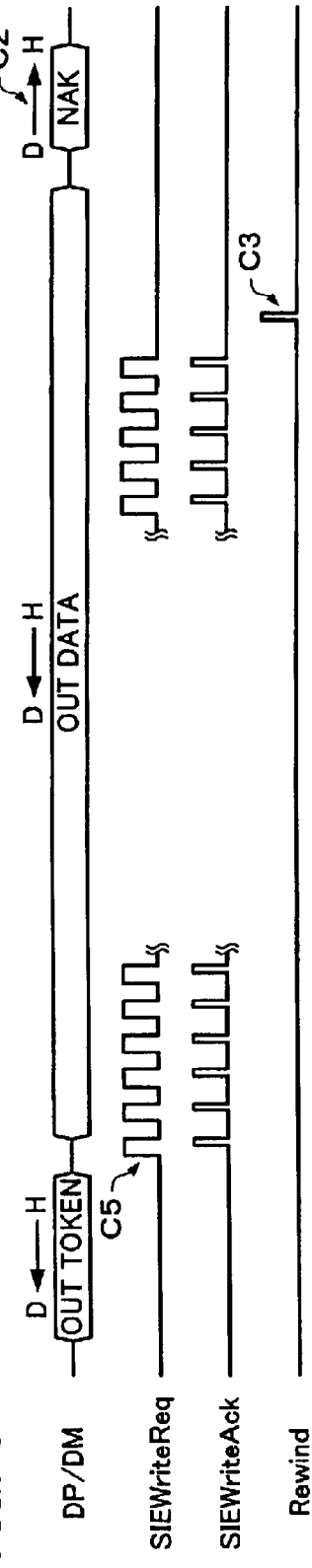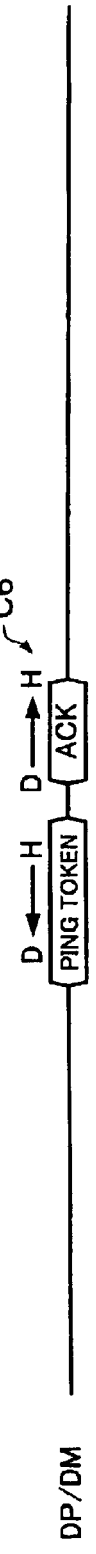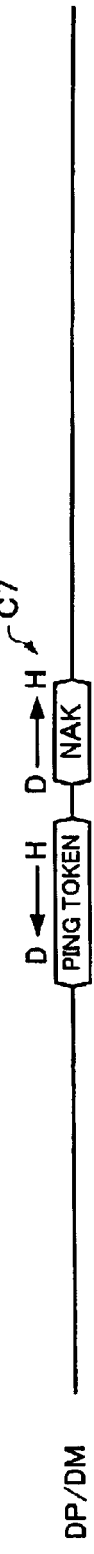
FIG. 8A OUT TRANSACTION (IF RESIDUAL AREA SIZE ≥ DATA SIZE (DATA LENGTH))
FIG. 8B OUT TRANSACTION (IF RESIDUAL AREA SIZE < DATA SIZE)
FIG. 8C PING TRANSACTION (IF RESIDUAL AREA SIZE ≥ DATA SIZE)
FIG. 8D PING TRANSACTION (IF RESIDUAL AREA SIZE < DATA SIZE)

DMA transfer (transfer to HDD)

FIG. 12 DEVICE ← HOST (OUT TRANSACTION, DATA TRANSFER IN FIRST DIRECTION)

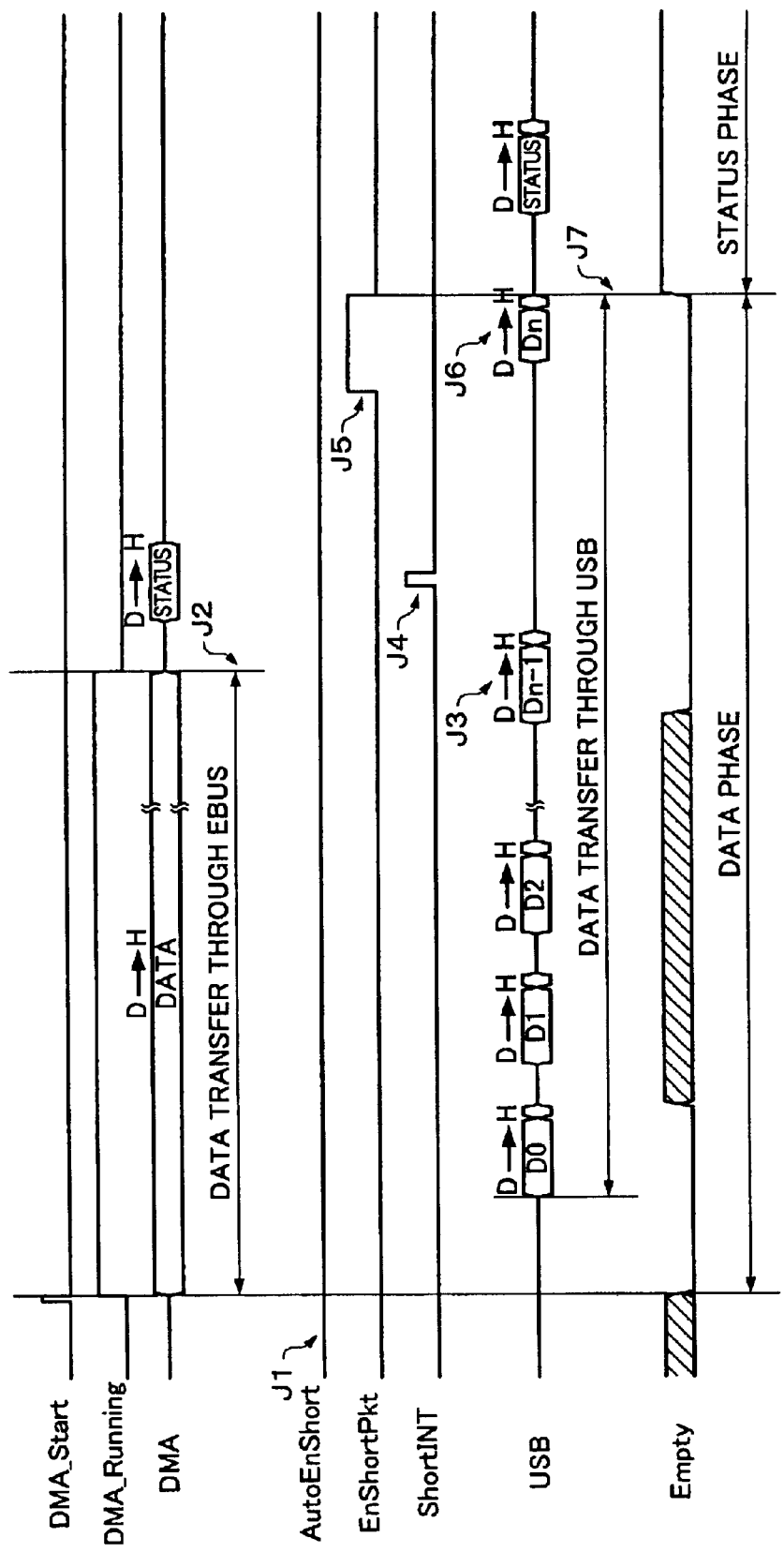

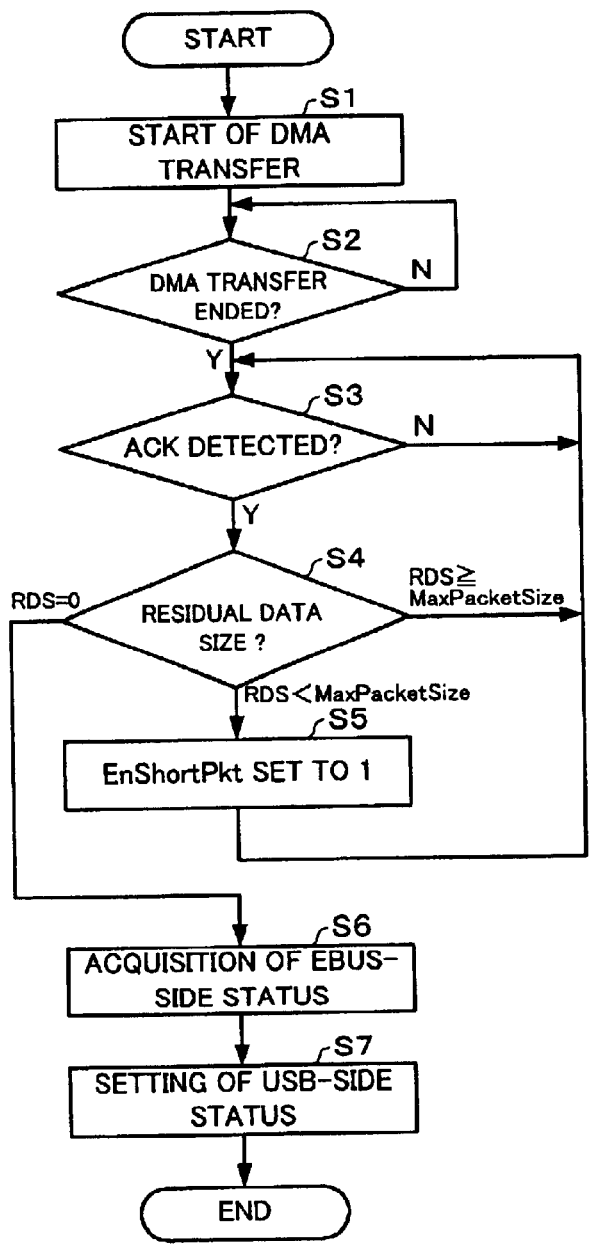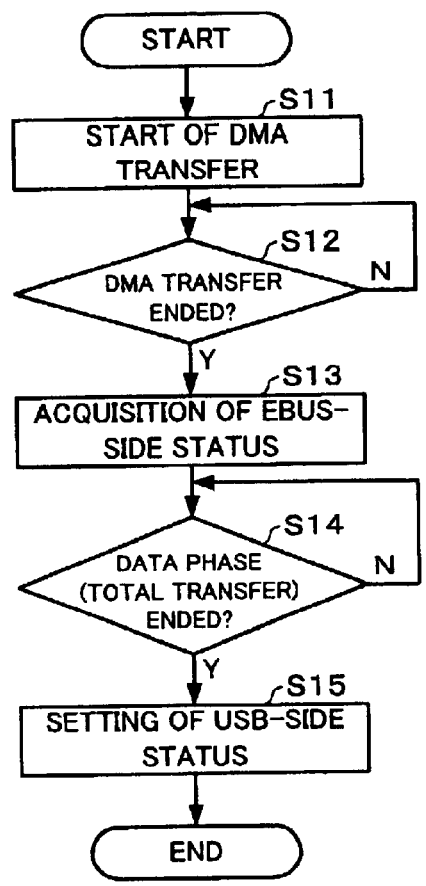
FIG. 17A COMPARATIVE EXAMPLE
FIG. 17B THIS EMBODIMENT

DATA TRANSFER CONTROL DEVICE, ELECTRONIC EQUIPMENT, AND DATA TRANSFER CONTROL METHOD

Japanese Patent Application No. 2001-143431, filed on May 14, 2001, is hereby incorporated by reference in its entirety.

BACKGROUND OF THE INVENTION

The present invention relates to a data transfer control device, electronic equipment, and a data transfer control method.

The universal serial bus (USB) standard has recently attracted attention as an interface standard for connections between personal computers and peripheral equipment (broadly speaking: electronic equipment). This USB standard has the advantage of enabling the use of connectors of the same standard to connect peripheral equipment such as a mouse, keyboard, and printer, which are connected by connectors of different standards in the prior art, and of making it possible to implement plug-and-play and hot-plug features.

In comparison with the IEEE 1394 standard, which is also attracting notice as a standard for the same serial bus interface, this USB standard has a problem in that the transfer speed thereof is slower.

In this case, attention is focussed on the decision to use the USB 2.0 standard which can implement a data transfer speed of 480 Mbps (in (high speed) HS mode), far faster than that of the previous USB 1.1 standard, while maintaining backward compatibility with USB 1.1.

With USB 2.0, data transfer is performed at 480 Mbps in high-speed (HS) mode. It therefore has the advantage of enabling its use as an interface for a storage device such as a hard disk drive or optical disk drive, which requires fast transfer speeds.

However, this means that the data transfer control device connected to the USB bus has to process the data that is transferred at the high speed of 480 Mbps. If the processing speed of the data transfer control device or the firmware (CPU) that controls the data transfer control device is slow, it is not possible to ensure the effective transfer speed and a problem occurs in that the bus zone could be lost.

BRIEF SUMMARY OF THE INVENTION

The present invention relates to a data transfer control device for data transfer through a bus, comprising: a buffer having a data storage area for storing data that is received through a first bus and transmitted through a second bus during data transfer in a first direction, and for storing data that is received through the second bus and transmitted through the first bus during data transfer in a second direction; and a buffer management circuit which manages the writing of data into the data storage area of the buffer and the reading of data from the data storage area, wherein the end of a data phase for the transfer of data during the data transfer in the first direction is determined on condition that data transmission through the second bus has ended; and wherein the end of a data phase for the transfer of data during the data transfer in the second direction is determined on condition that data reception through the second bus has ended and also the data storage area of the buffer has become empty.

BRIEF DESCRIPTION OF THE SEVERAL VIEWS OF THE DRAWING

FIGS. 1A, 1B, 1C, and 1D are illustrative of end points and transaction configurations under USB;

FIGS. 2A and 2B are illustrative of the CBI specification and the Bulk-Only specification;

FIG. 3 shows the CBW format;

FIG. 4 shows the CSW format;

FIGS. 8A, 8B, 8C, and 8D are timing waveform chart illustrative of OUT transactions and PING transactions;

FIG. 16 is a timing waveform chart illustrative of a method of notifying the firmware of the presence of a short packet;

FIGS. 17A and 17B are flowcharts of firmware processing by a comparative example and one embodiment of the present invention;

DETAILED DESCRIPTION OF THE EMBODIMENTS

Figure 5:
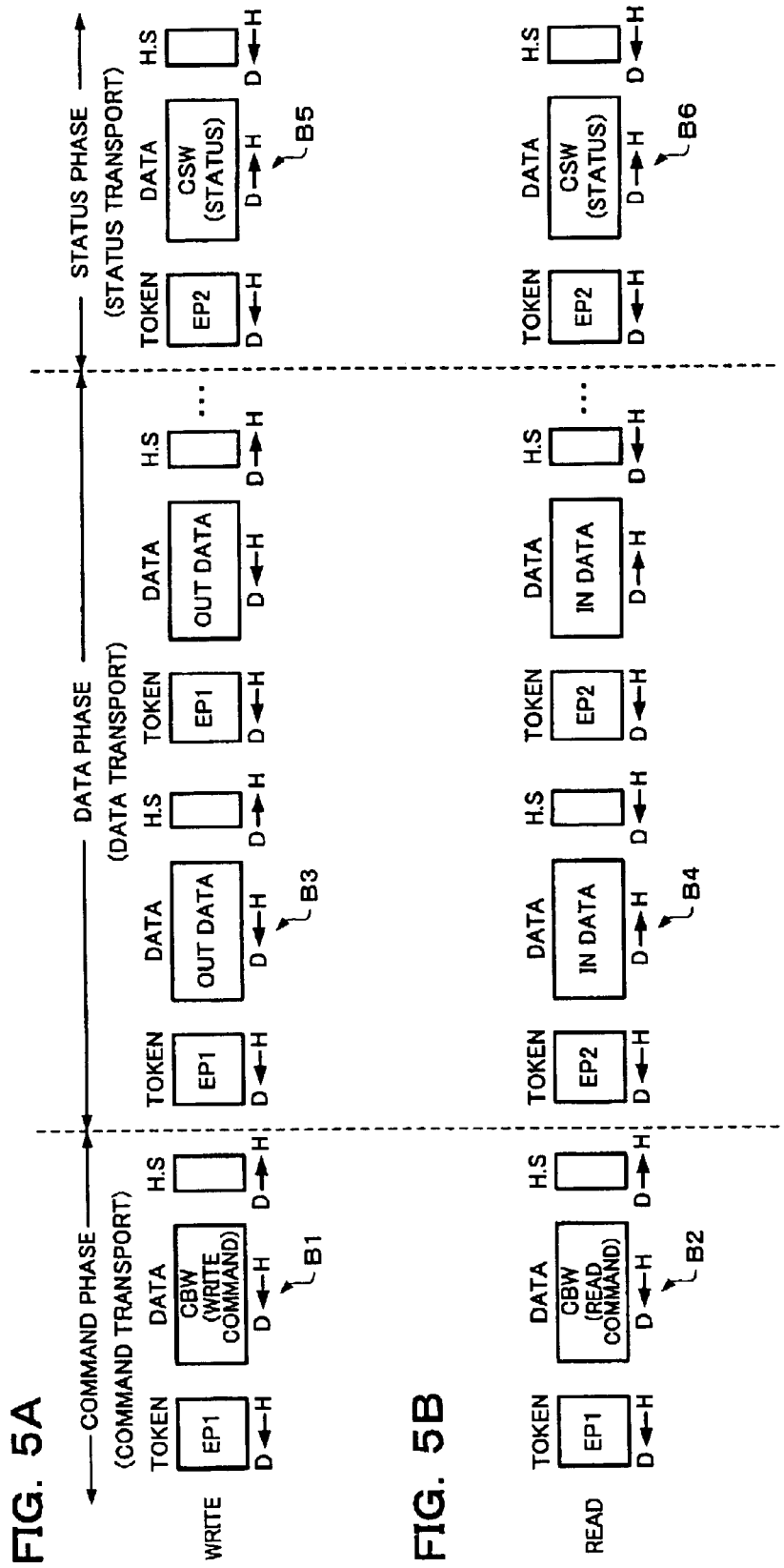
FIGS. 5A and 5B are illustrative of the writing and reading of data during Bulk-Only.

Various embodiments of the present invention will be described below.

Note that the embodiments described hereunder do not in any way limit the scope of the invention defined by the claims laid out herein. Note also that all the elements of these embodiments should not be taken as essential requirements to the means of the present invention.

According to one embodiment of the invention, there is provided a data transfer control device for data transfer through a bus. The data transfer control device comprises:

a buffer having a data storage area for storing data that is received through a first bus and transmitted through a second bus during data transfer in a first direction, and for storing data that is received through the second bus and transmitted through the first bus during data transfer in a second direction; and a buffer management circuit which manages the writing of data into the data storage area of the buffer and the reading of data from the data storage area, wherein the end of a data phase for the transfer of data during the data transfer in the first direction is determined on condition that data transmission through the second bus has ended; and wherein the end of a data phase for the transfer of data during the data transfer in the second direction is determined on condition that data reception through the second bus has ended and also the data storage area of the buffer has become empty.

This embodiment makes it possible to determine the end of a data phase (data transport: transfer of all the data) during data transfer in a first direction, on condition that data transmission (such as DMA transfer) through the second bus has ended. During data transfer in the second direction, on the other hand, the end of the data phase is determined on condition that data reception through the second bus has ended and the data storage area has subsequently become empty.

This makes it possible to easily determine the end of the data phase during data transfer in both the first and second directions, by simply checking the transfer data size (data length) on the second bus side. This makes it possible to simplify the circuit configuration and circuit control, thus enabling a reduction in the processing load on a processing unit that controls the data transfer control device.

The data transfer control device may further comprise a counter which counts the size of data transmitted or received through the second bus.

The provision of such a counter makes it possible to easily check the size of data transferred on the second bus side. It also enables simplification of control over the counter, since it is not necessary to provide a counter on the first bus side.

In the data transfer control device, the status of the data reception through the second bus may be acquired, and the thus-acquired status may be transmitted though the first bus during a status phase after the end of the data phase.

This makes it possible to efficiently utilize a period after the end of data reception through the second bus and up to the end of the data phase, for processing related to the status, thus enabling an increase in the effective transfer speed.

In the data transfer control device, a short packet in the data storage area may be automatically transmitted through the first bus, when data reception through the second bus ends and also the size of data remaining in the data storage area of the buffer is less than the maximum packet size.

This enables the automatic transmission of a short packet in the data storage area by hardware, without involving the processing unit. This makes it possible to reduce the processing load on the processing unit, enabling an increase in the effective transfer speed.

The data transfer control device may further comprise a unit which sets the automatic transmission of a short packet from the data storage area to either enabled or disabled.

This makes it possible to increase versatility of the data transfer control device, by supporting both a device that is permitted to automatically transmit a short packet and a device that is not permitted to automatically transmit a short packet.

In the data transfer control device, the automatic transmission may be set to be disabled when data that has been received through the second bus has given information and is transmitted through the first bus.

This makes it possible to efficiently prevent a situation in which a host or the like connected to the first bus erroneously recognized the end of the data phase when the data phase has not ended.

In the data transfer control device, a processing unit may be notified of the presence of a short packet in the data storage area, when data reception through the second bus ends and also the size of data remaining in the data storage area of the buffer is less than the maximum packet size.

This makes it possible for the processing unit to execute processing that is appropriate to the situation, thus enabling the implementation of suitable data transfer control, even with a device that is not permitted to automatically transmit a short packet, for example.

In the data transfer control device, information that has been input first to the data storage may be output first from the data storage area.

This makes it possible to implement efficient data reception and transmission during direct memory access (DMA) transfer, or the like, by setting the data storage area to be a first-in, first-out storage area.

In the data transfer control device, data transfer may be in accordance with the universal serial bus (USB) standard.

It should be noted, however, that this embodiment could also be applied to standards other than USB (or future standards that inherit the concept of USB).

Electronic equipment in accordance with one embodiment of the present invention comprises any of the above described data transfer control devices; and a device which performs output processing, fetch processing, or storage processing on data transferred through the data transfer control device and the bus.

Since this embodiment makes it possible to reduce the processing load on the processing unit (such as the firmware) that controls the data transfer of the data transfer control device, it enables benefits such as reductions in the cost and scale of electronic equipment.

This embodiment is described below with reference to the accompanying figures.

1. USB 1.1 Data Transfer Method

The data transfer method in accordance with USB (USB 2.0) will first be described briefly.

USB differs from other methods such as IEEE 1394 in that a host takes the initiative. In other words, activation of a data transfer transaction is done by the host side and the greater part of control relating to data transfer is done by the host. This increases the processing load on the host, but since the personal computer (PC) that forms the host has a high-speed, high-performance CPU (processor), the processing of such a heavy load is not too much of a problem.

Since the device (target) need only respond to a request from the host under USB, the processing and configuration on the device side can be simplified. It is therefore not necessary to use a high-performance, fast CPU on the device side, such as the host, making it possible to use an inexpensive CPU (microprocessor), thereby reducing costs.

To implement this data transfer under USB, with the host taking the lead, end points (EP0 to EP15) are provided on the device side, as shown in FIG. 1A. In this case, an end point is equivalent to an entrance to a buffer (FIFO) for data transfer between the host and the device, where all of the data transfer done under USB is done through these end points.

Each of these end points can be addressed uniquely by a device address and an end point number. In other words, the host can freely perform data transmission to a desired end point or data reception from a desired end point, by specifying a device address and an end point number.

End point specification is done freely by the device side, and the host can be notified of details such as the allocation of end point numbers and the sizes of storage areas allocated to those end points, during enumeration processing.

Note that USB provides control transfer, isochronous transfer, interrupt transfer, and bulk transfer as data transfer types.

In this case, control transfer is a transfer mode for control performed through a control end point between the host and the device (target). This control transfer sends information such as configuration information for initializing the device.

Isochronous transfer is a transfer mode that is provided for transferring data where it is more important to ensure bandwidth rather than correctness, such as image data or audio data. Since this isochronous transfer ensures that a fixed quantity of data can be transferred in a fixed period, it is an effective transfer mode for applications where real-time data capabilities are important.

Interrupt transfer is a transfer mode that is provided for transferring a small quantity of data at a comparatively low transfer speed.

Bulk transfer is a transfer mode that is provided for transferring a large quantity data that occurs at irregular periods. This bulk transfer enables data transfer at spare times other than times being used by isochronous transfers or interrupt transfers, and also enables checking of the correctness of the data. It is therefore an effective transfer mode for data transfer where real-time capabilities are not important but data reliability can be ensured.

1.2 Transaction Configuration

A transaction in USB bulk transfer mode is basically made up of three packets as shown in FIG. 1B: a token packet, a data packet, and a handshake packet. Note that a handshake packet is not necessary with isochronous transfer.

In this case, a token packet is a packet that is used in situations such as when the host requests a read or write with respect to an end point of the device (target). This token packet has fields such as PID (a packet ID such as OUT, IN, SOF, or SETUP), ADDR (device address), ENDP (end point number), and CRC (Cyclic Redundancy Check), by way of example.

A data packet is a packet for sending the actual data, and has PID (DATA0, DATA1), DATA (the actual data), and CRC fields.

A handshake packet is a packet used by the reception side to inform the transmitter side whether or not data reception was successful, and has a PID (ACK, NAK, or STALL) field.

With an OUT transaction (a transaction whereby the host outputs information to the device), the host first sends an OUT token packet to the device, as shown in FIG. 1C. The host then sends an OUT data packet to the device. If the device succeeds in receiving the OUT data packet, it sends an ACK handshake packet to the host.

With an IN transaction (a transaction whereby the host inputs information from the device), on the other hand, the host first sends an IN token packet to the device, as shown in FIG. 1D. On receiving the IN token packet, the device sends an IN data packet to the host. If the host succeeds in receiving the IN data packet, it sends an ACK handshake packet to the device.

In FIGS. 1C and 1D, note that "D←H" in FIGS. 1C and 1D means that information is transferred from the host to the device and "D→H" means that information is transferred from the device to the host (this convention is used hereinafter in the figures and description"

1.3 Bulk-Only

USB devices are divided into a number of classes. Devices such as hard disk drives and optical disk drives belong to a class called mass storage, and there are specifications created by the vendors of electronic equipment within this mass storage class, such as control/bulk/interrupt (CBI) and Bulk-Only specifications.

With the CBI specification, the device provides end points EP0, EP1, EP2, and EP3 for control, bulk-out, bulk-in, and interrupt, as shown in FIG. 2A. In this case, the end point EP0 is for the transfer of USB-layer control packets or command packets. EP1 is for the transfer of OUT data (data transferred from the host to the device), EP2 is for the transfer of IN data (data transferred from the device to the host), and EP3 is for the transfer of interrupt IN packets. Note that any of EP1 to EP15 can be allocated as bulk-out, bulk-in, and interrupt IN end points, from the device side.

With the Bulk-Only specification, on the other hand, the device provides end points EP0, EP1, and EP2 for control, bulk-out, and bulk-in, as shown in FIG. 2B. In this case, the end point EP0 is for the transfer of USB-layer control packets. EP1 is for the transfer of commands (CBW) and OUT data, and EP2 is for the transfer of statuses (CSW) and IN data packets. Note that any of EP1 to EP15 can be set to be bulk-out and bulk-in end points, from the device side.

In this case, a command block wrapper (CBW) is a packet that includes a command block and information relating to the command block, and has the format shown in FIG. 3. A command status wrapper (CSW) is a packet that includes the status of a command block, and has the format shown in FIG. 4.

In FIG. 3, dCBWSignature is information for identifying that packet as a CBW, dCBWTag is a command block tag, and dCBWDataTransferLength specifies the length of data to be transferred in the data phase. The bmCBWFlags field is a flag for specifying the transfer direction or the like, dCBWLUN is a logical unit number, bCBWCBLength is the command length, and CBWCB is a command block in which an ATA/ATAPI or SCSI command is encapsulated and described.

In FIG. 4, dCSWSignature is information for identifying that packet as a CSW, dCSWTag is a status block tag, and the value of the dCBWTag of the CBW corresponding to that CSW is written therein. The CSWDataResidue field gives the difference between the length of data specified by dCBWDataTransferLength of the CBW and the length of data that the device has actually processed, and bCSWStatus is a status block.

The description now turns to the processing for writing or reading data under the Bulk-Only specification of FIG. 2B, with reference to FIGS. 5A and 5B.

When the host writes data to the device, it first performs a command phase (command transport) in which it transfers a CBW to the device, as shown in FIG. 5A. More specifically, the host transfers a token packet specifying the end point EP1 to the device, then transfers a CBW (see A1 in FIG. 2B and FIG. 3) to the end point EP1 of the device. This CBW comprises a write command. If the device returns a handshake (H.S) to the host, the command phase ends.

When the command phase (command transport) ends, the data phase (data transport) starts. In this data phase, the host first transfers a token packet specifying the end point EP1 of the device, then it transfers OUT data (see A2 in FIG. 2B) to the end point EP1 of the device. Each transaction ends when an ACK handshake is returned from the device to the host. Transactions are repeated in this manner and the data phase ends when data has been transferred up to the data length specified in dCBWDataTransferLength of the CBW (see FIG. 3).

When the data phase (data transport) ends, a status phase (status transport) starts. In this status phase, the host first transfers a token packet specifying the end point EP2 to the device. When that happens, the device transfers the CSW that is at the end point EP2 (see A3 in FIG. 2B and FIG. 4) to the host. The status phase ends when an ACK handshake is returned from the host to the device.

When the host reads data, it first transfers a token device specifying the end point EP1 to the device, then it transfers the CBW to the end point EP1 to the device. This CBW comprises a read command. If a handshake returns from the device to the host, the command phase ends.

When the command phase ends, the data phase starts. In this data phase, the host first transfers a token packet specifying the end point EP2 to the device. When that happens, the device transfers the IN data that is at the end point EP2 (see A4 in FIG. 2B) to the host, and one transaction ends. Transactions are repeated in this manner and the data phase ends when data has been transferred up to the data length specified in dCBWDataTransferLength of the CBW.

When the data phase ends, the status phase starts. The processing in this status phase is similar to that of data write processing described with reference to FIG. 5A.

2. Characteristics of this Embodiment 2.1 Configuration

Figure 6:
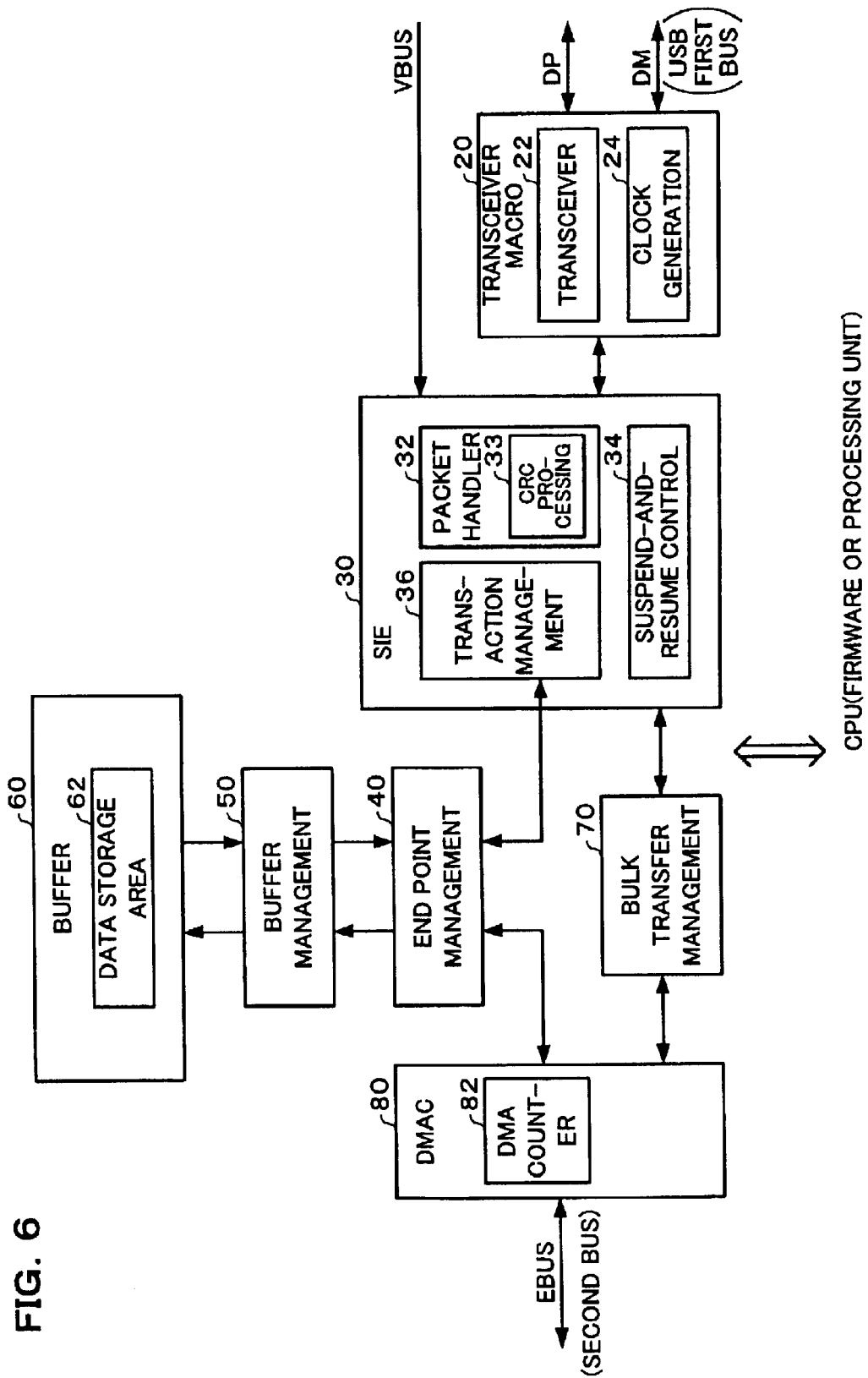
FIG. 6 shows a configuration of a data transfer control device according to one embodiment of the present invention.

A configuration of the data transfer control device according to one embodiment of the present invention is shown in FIG. 6.

The data transfer control device of this embodiment comprises a transceiver macro 20, an SIE 30, an end point management circuit 40, a buffer management circuit 50, a buffer 60, a bulk transfer management circuit 70, and a DMAC 80. Note that not all of the circuit blocks shown in FIG. 6 are necessary for the data transfer control device of the present invention, and thus some of them could be omitted.

In this case, the transceiver macro 20 is a circuit for implementing data transfer in (full speed) FS mode or HS mode by USB (the first bus). A macro cell conforming to the USB 2.0 transceiver macrocell interface (UTMI), which defined interface specifications for parts of the physical-layer and logical-layer circuitry under USB 2.0, could be used as this transceiver macro 20, by way of example. This transceiver macro 20 comprises a transceiver circuit 22 and a clock generation circuit 24.

The transceiver circuit 22 comprises an analog front-end circuit (reception and transmission circuitry) for transmitting and receiving data by USB (a first bus), using difference signals DP and DM. It also comprises circuitry for processing such as bit stuffing, bit unstuffing, serial-to-parallel conversion, parallel-to-serial conversion, NRZI decoding, NRZI encoding, and sampling clock generation.

The clock generation circuit 24 is a circuit for generating clocks such as those used in the generation of the operating clock or sampling clock used by the data transfer control device, and comprises components such as PLLs and oscillation circuits for generating 480-MHz and 60-MHz clocks.

A serial interface engine (SIE) is a circuit for performing various types of processing such as USB packet transfer processing, and it comprises a packet handler circuit 32, a suspend-and-resume control circuit 34, and a transaction management circuit 36.

The packet handler circuit 32 is a circuit for assembling (creating) or analyzing packets formed of headers and data, and it comprises a CRC processing circuit 33 that generates and decodes CRCs.

The suspend-and-resume control circuit 34 is a circuit for sequence control during the suspension and resumption of processing.

The transaction management circuit 36 is a circuit for managing transactions made up of token, data, handshake, and other packets. More specifically, when a token packet is received, this circuit confirms whether or not it has the device's own address and, if it does have that address, it performs processing to transfer packets to or from the host, then processing for transferring a handshake packet.

The end point management circuit 40 is a circuit for managing the end points that form entrances to the various storage areas of the buffer, and it comprises components such as registers (a register set) for storing attribute information for those end points.

The buffer management circuit 50 is a circuit for managing the buffer 60, and is formed of components such as RAM. More specifically, it generates write addresses or read addresses and performs processing to write data to the buffer 60 or read data from the buffer 60.

The buffer 60 (packet storage means) is designed to store data (packets) temporarily, for transfer through USB, and it has various functions such as compensating for any speed difference between the data transfer speed of USB (the first bus) and the data transfer speed of EBUS (the second bus, or DMA bus). Note that EBUS is an external bus that connects together devices such as hard disk drives, CD drives, and scanners.

With this embodiment of the present invention, the buffer 60 has a data storage area 62 (FIFO: a storage area set to FIFO) for storing data (OUT data) to be received through USB (a first bus) and transmitted through EBUS (a second bus) during data transfer in a first direction (OUT transaction), and data (IN data) to be received through EBUS and transmitted through USB during data transfer in a second direction (IN transaction).

The data transfer control device of this embodiment also determines that a data phase (data transport: the transfer of all the data) has ended during data transfer in the first direction, on condition that data transmission through EBUS has ended. Similarly, it determines that the data phase has ended during data transfer in a second direction, on condition that data reception via EBUS has ended and the data storage area 62 of the buffer 60 has become empty (an acknowledgment concerning the final-data packet has been returned through USB).

If data reception via EBUS ends and the residual data size (data length, number of transfers) in the data storage area 62 (FIFO: an area set to FIFO) of the buffer 60 is less than the maximum packet size, the data transfer control device of this embodiment automatically transfers a short packet (a packet of a size that is less than the maximum packet size) of the data storage area 62 through USB, and CPU (firmware or processing unit) is notified of the presence of the short packet by an interrupt signal or the like.

With this embodiment, a command storage area (first storage area) for command blocks and a data storage area (second storage area) for data are provided on the buffer 60 for when a command block (first information) and data (second information: OUT data) have been allocated (see A1 and A2 of FIG. 2B) as information to be transferred through one end point (EP1 of FIG. 2B).

During the command phase (first phase), in which a command block is transferred through USB, the buffer management circuit 50 takes the information that is to be transferred from the host to the end point (EP1) and writes it to a command storage area for the command block. During the data phase (second phase), in which data (OUT data) is transferred through USB, it takes the information that is to be transferred from the host to the end point and writes it to a data storage area for data. In other words, it switches the write area for information (command block or data) on condition that the phase has switched.

Alternatively, this embodiment of the present invention could be configured in such a manner that a data storage area (third storage area) for data and a status storage area (fourth storage area) for a status block are provided on the buffer, for when data (third information: IN data) and a status block (fourth information) have been allocated (A3 and A4 in FIG. 2B) as information to be transferred through one end point (EP2 in FIG. 2B).

The buffer management circuit 50 takes information transferred from the end point (EP2) to the host and reads it into data storage area for data, during a data phase (third phase) in which data (IN data) is transferred through USB, and takes information transferred from the end point to the host and reads it into a status storage area for statuses, during a status phase (fourth phase) in which a status block is transferred through USB. In other words, the read area for information (data or status block) is switched on condition that the phase is switched.

This configuration makes it possible to process OUT data in a data storage area while processing command blocks in a command storage area, even when a plurality of types of information (command block, OUT data, IN data, status block) has been allocated to one end point. Alternatively, it enables the processing of a status block in the status storage area while processing IN data in the data storage area. It therefore becomes possible to increase the processing speed of the data transfer control device and reduce the load on the firmware (processing unit), thus making it possible to increase the effective bus transfer speed.

The bulk transfer management circuit 70 is a circuit for managing bulk transfers under USB.

The DMAC 80 is a DMA controller for performing DMA transfers through EBUS, and comprises a DMA counter 82. The DMA counter 82 is a circuit for counting the size of data (number of transfers and data length) to be transmitted or received by EBUS (the second bus).

2.2 Detailed Connection

Figure 7:
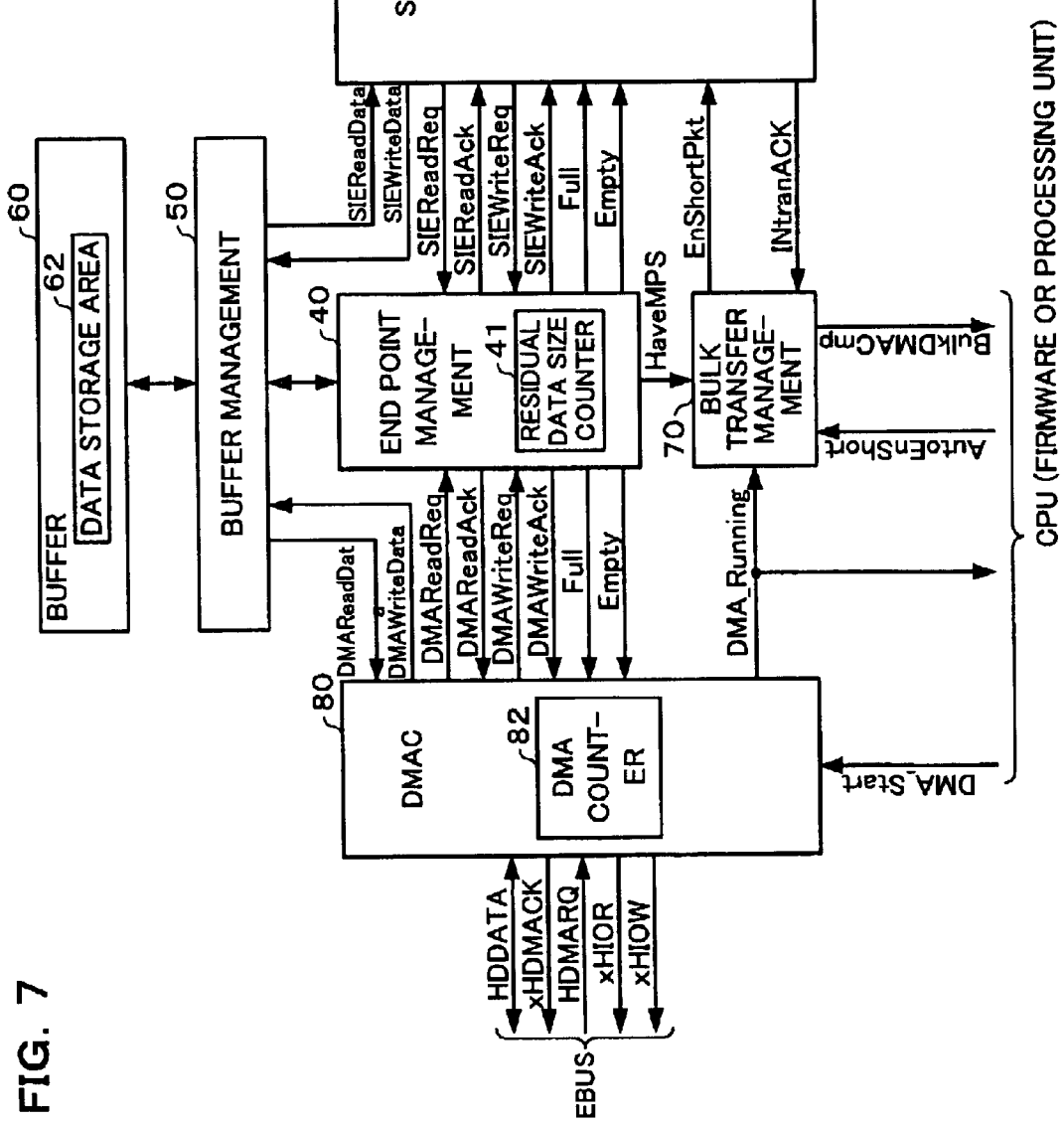
FIG. 7 shows a detailed connection of a data transfer control device according to one embodiment of the present invention.

A detailed connection between the SIE 30, the end point management circuit 40, the buffer management circuit 50, the buffer 60, the bulk transfer management circuit 70, and the DMAC 80 is shown in FIG. 7.

In FIG. 7, SIEReadData is data (IN data) to be read from the buffer 60 (the data storage area 62) and transferred to the host through USB (the first bus). SIEWriteData is data (OUT data) to be transferred from the host by USB and written to the buffer 60. DMAReadData is data to be read from the buffer 60 and transferred (by DMA transfer) to a device such as a hard disk drive HDD through EBUS (the second bus). DMAWriteData is data to be transferred from the HDD or the like through EBUS and written to the buffer 60.

A SIEReadReq signal that is output from the SIE 30 is a signal that requests the reading of SIEReadData, and SIEReadAck that is output from the end point management circuit 40 is an acknowledge signal with respect to SIEReadReq. In a similar manner, SIEWriteReq is a signal that requests the writing of SIEWriteData and SIEWriteAck is an acknowledge signal with respect to SIEWriteReq.

The DMAReadReq signal that is output from the DMAC 80 is a signal for requesting the reading of DMAReadData, and DMAReadAck that is output from the end point management circuit 40 is an acknowledge signal with respect to DMAReadReq. In a similar manner, DMAWriteReq is a signal that requests the writing of DMAWriteData and DMAWriteAck is an acknowledge signal with respect to DMAWriteReq.

The Full signal indicates whether or not the data storage area 62 of the buffer 60 is full, and the Empty signal indicates whether or not the data storage area 62 is empty. In this case, the determination of whether or not the data storage area 62 is full, or whether or not it is empty, is based on a count from a residual data size counter 41 that counts the size of data remaining in the data storage area 62 (residual data area).

Note that the data storage area 62 of this embodiment is an area in which data that is input first thereto is output first therefrom (FIFO: an area set to FIFO). In this case, the data storage area 62 can be set to be a first-in, first-out area by configuring it of serially connected registers or memory, or it could be set to be a first-in, first-out area by skillful address control of RAM.

A HaveMPS signal that is output by the end point management circuit 40 indicates whether or not the size of data (data length) remaining in the data storage area 62 of the buffer 60 is the maximum packet size. Taking the maximum packet size to be 512 bytes by way of example, HaveMPS is active (high) when the residual data size is 512 bytes (or more) and HaveMPS goes inactive (low) when the residual data size is between 0 to 511 bytes. In this case, the residual data size is obtained by the residual data size counter 41.

An HDDATA signal is data to be transferred by DMA through EBUS (the second bus), xDMACK is an acknowledgment signal with respect to that DMA transfer, and xDMARQ is a request signal for DMA transfer. Note that xHIOR is a read pulse signal and xHIOW is a write pulse signal.

The CPU (firmware) uses a DMA_Start signal to indicate the start of DMA transfer. A DMA_Running signal indicates that DMA transfer through EBUS is in progress; it goes active (high) at the beginning of DMA transfer by EBUS and inactive (low) at the end of the DMA transfer. In other words, DMA_Running is active during the period of data transfer (data phase) by EBUS.

An AutoEnShort signal is used to set the automatic transmission of a short packet that exists within the data storage area 62 of the buffer 60 to either enabled or disabled. An EnShortPkt signal indicates the transfer of a short packet to the SIE 30.

If data reception via EBUS ends and also the size of data remaining in the data storage area 62 is less than the maximum packet size when AutoEnShort is set to high, by way of example, EnShortPkt becomes active. This causes the automatic transmission through USB of the short packet (a packet of less than the maximum packet size) that exists in the data storage area 62, by the SIE 30.

More specifically, if HaveMPS goes inactive (to indicate less than the maximum packet size) after DMA_Running becomes inactive (data reception end), EnShortPkt becomes active and the short packet in the data storage area 62 is automatically transmitted by the SIE 30.

An INTranACK signal is an acknowledgment of the IN transaction; it goes active when the host replies appropriately. A BulkDMACmp signal indicates that the data phase (transfer of all the data) has ended, during bulk transfer.

If the data storage area 62 becomes empty and an acknowledgment of the transmission of the final data (IN data) packet is returned from the host, after data reception through EBUS has ended, INTranACK goes active. When that happens, BulkDMACmp becomes active and the firmware (CPU is notified that the data phase (transfer of all the data) has ended. This enables the firmware to move on to processing the subsequent status phase.

2.3 Operation

The description now turns to the operation of this embodiment.

A timing waveform chart shown in FIG. 8A illustrates a case in which the size of the remaining area (empty area) of the data storage area 62 (FIFO) of the buffer 60 is greater than or equal to the size of data (data length) that is being transferred from the host, during an OUT transaction (data transfer in a first direction, for transferring data from the host to the device). In this case, since all of the data from the host can be written into the data storage area 62, an ACK can be returned to the host, as shown at C1 in FIG. 8A.

Note that if the data storage area 62 has a single-buffer structure instead of a double-buffer structure, it will not be possible to receive the next packet from the host when in HS mode, until the data storage area 62 is emptied. In such a case, therefore, NYET is returned to the host instead of ACK. Even with a double-buffer structure, it could happen that the next data cannot be received because both buffers are in use, in which case NYET is returned to the host instead of ACK, in a similar manner.

A timing waveform chart shown in FIG. 8B illustrates a case in which the data size is less than the size of the remaining area of the data storage area 62, during an OUT transaction.

In this case, it is not possible to write all of the data from the host into the data storage area 62, so NAK is returned to the host, as shown at C2 in FIG. 8B. To cancel the data received by the data transfer corresponding to the current OUT token, a Rewind signal becomes active as shown at C3.

Note that when the SIE 30 makes SIEWriteReq active at C4 and C5 in FIGS. 8A and 8B, the buffer management circuit 50 generates the write address for SIEWriteData in accordance with the instruction from the end point management circuit 40, and outputs it to the buffer 60. This causes SIEWriteData (of four bytes, by way of example) to be written into the data storage area 62 of the buffer 60 and SIEWriteAck to be returned to the SIE 30. The data from the host (such as 512 bytes of data) is written sequentially into the data storage area 62 by repeating this write processing four bytes at a time.

Timing waveform charts shown in FIGS. 8C and 8D illustrate the PING transaction (PING protocol) by which the host enquires from the device whether or not the data storage area 62 is empty. This PING transaction is supported in USB HS mode. This protocol is used when NYET has been received from the device with respect to an OUT token or OUT data from the host.

During this PING transaction, if the size of the area remaining in the data storage area 62 (the empty size) is greater than or equal to the data size, ACK is returned to the host as shown at C6 in FIG. 8C. If the size of the area remaining in the data storage area 62 is less than the data size, on the other hand, NAK is returned to the host as shown at C7 in FIG. 8D.

Figure 9A:
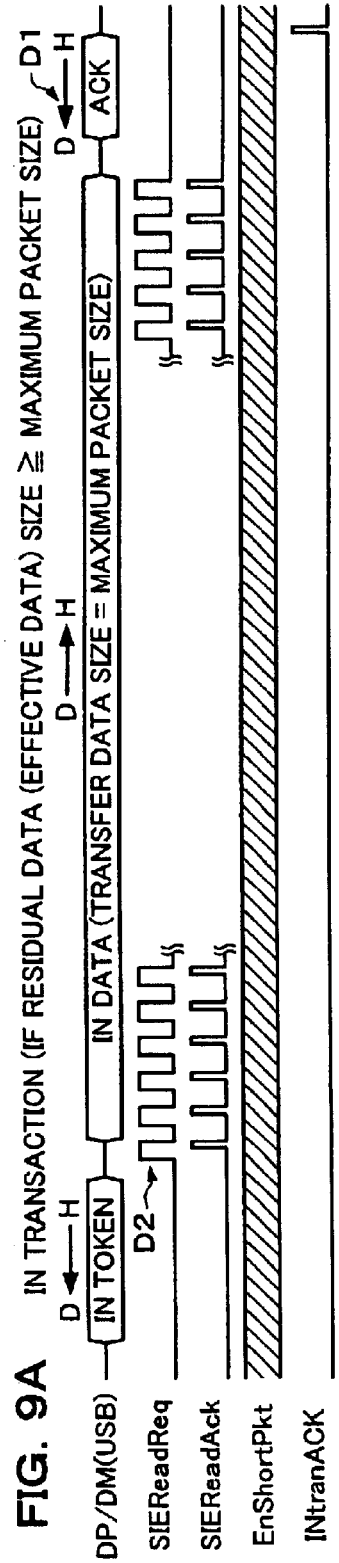
FIGS. 9A, 9B, and 9C are timing waveform chart illustrative of IN transactions.

A timing waveform chart shown in FIG. 9A illustrates a case in which the size of data (valid data) remaining in the data storage area 62 is greater than or equal to the maximum packet size during an IN transaction (data transfer in a second direction, for transferring data from the device to the host). In this case, ACK is returned from the host to the device when data of the maximum packet size has been transferred to the host, as shown at D1 in FIG. 9A.

Note that when the SIE 30 makes SIEReadReq active at D2 in FIG. 9A, the buffer management circuit 50 generates the read address for SIEReadData in accordance with the instruction from the end point management circuit 40, and outputs it to the buffer 60. This causes SIEReadData (of four bytes, by way of example) to be written into the data storage area 62 of the buffer 60 and SIEReadAck to be returned to the SIE 30. The data to be transferred to the host is read sequentially into the data storage area 62 by repeating this read processing four bytes at a time.

Figure 9B:
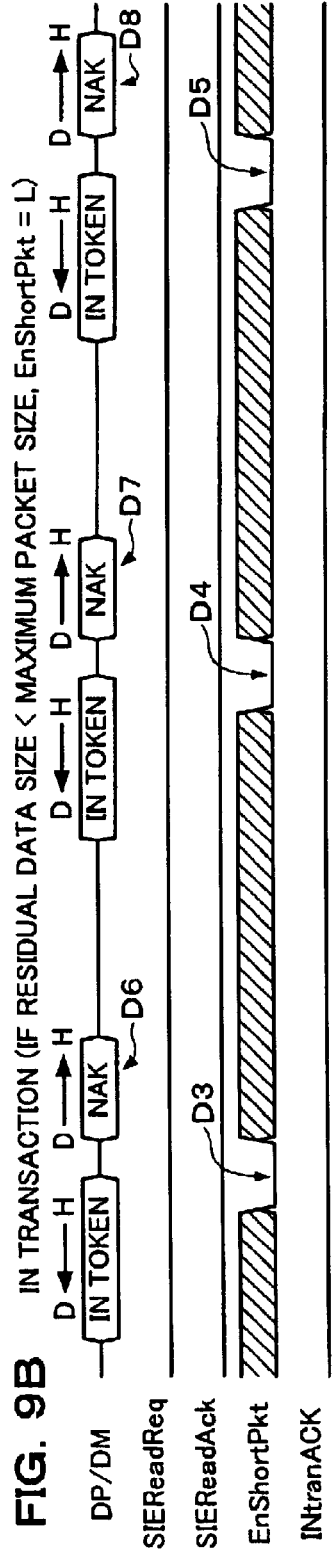

A timing waveform chart shown in FIG. 9B illustrates a case in which the size of data remaining in the data storage area 62 is less than the maximum packet size, and also EnShortPkt (see FIG. 7) is low (inactive). In this case, the transfer of a short packet (a packet of less than the maximum packet size) is inhibited by EnShortPkt being low, as shown at D3, D4, and D5 in FIG. 9B. NAK is therefore returned in answer to IN tokens from the host, as shown at D6, D7, and D8.

Figure 9C:
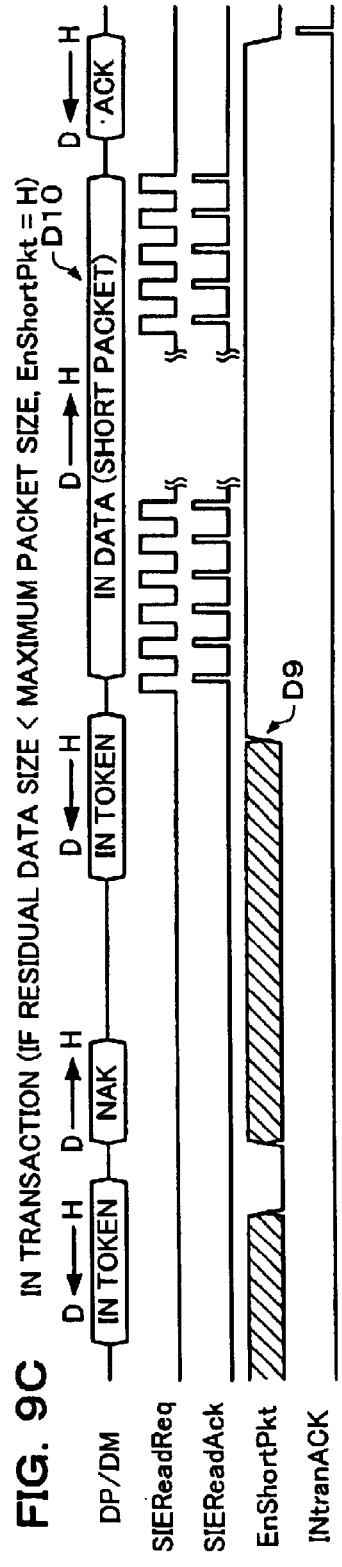

A timing waveform chart shown in FIG. 9C illustrates a case in which the size of data remaining in the data storage area 62 is less than the maximum packet size, and also EnShortPkt is high (active). In this case, the transfer of a short packet is permitted because EnShortPkt is high, as shown at D9 in FIG. 9C, and a short packet that exists in the data storage area 62 is transferred as appropriate to the host, as shown at D10.

Note that the data storage area 62 of the buffer 60 could be an area used in common for OUT transactions and IN transactions, or it could be separate areas.

Figure 10:
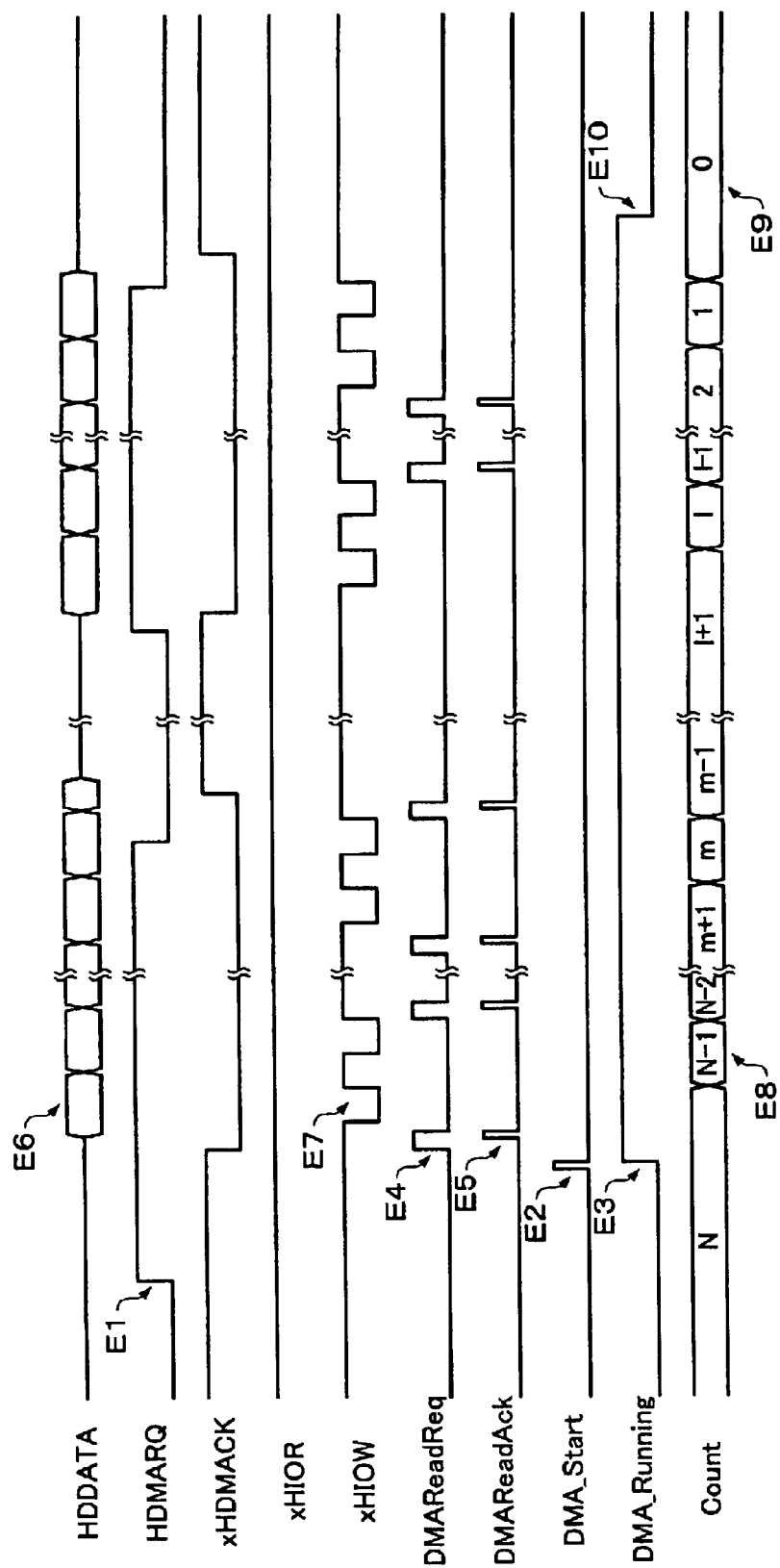
FIG. 10 is a timing waveform chart illustrative of DMA transfer during transmission to an HDD.

A timing waveform chart shown in FIG. 10 relates to DMA transfer during data transmission to a device such as a hard disk drive HDD.

If both HDMARQ (see FIG. 7) from the hard disk drive HDD and DMA_Start from the CPU become active, as shown at E1 and E2 in FIG. 10, DMA transfer begins and DMA_Running becomes active as shown at E3.

DMAReadReq and DMAReadAck are then used for handshaking, as shown at E4 and E5, and a quantity of data, such as four bytes (32 bits) is read from the data storage area 62 of the buffer 60. The thus-read four bytes of data are transmitted to the HDD two bytes at a time, by way of example, through the 16-bit bus EBUS, using the write pulse signal xHIOW, as shown at E6 and E7.

Every time data is transmitted, the value Count (number of data transfers) in the DMA counter 82 is decremented, as shown at E8. Note that the setting of the initial value N of Count is based on dCBWDTransferLength of the CBW of FIG. 3.

When Count reaches 0 as shown at E9 and the transfer of all data through EBUS has ended, DMA_Running becomes inactive, as shown at E10.

Figure 11:
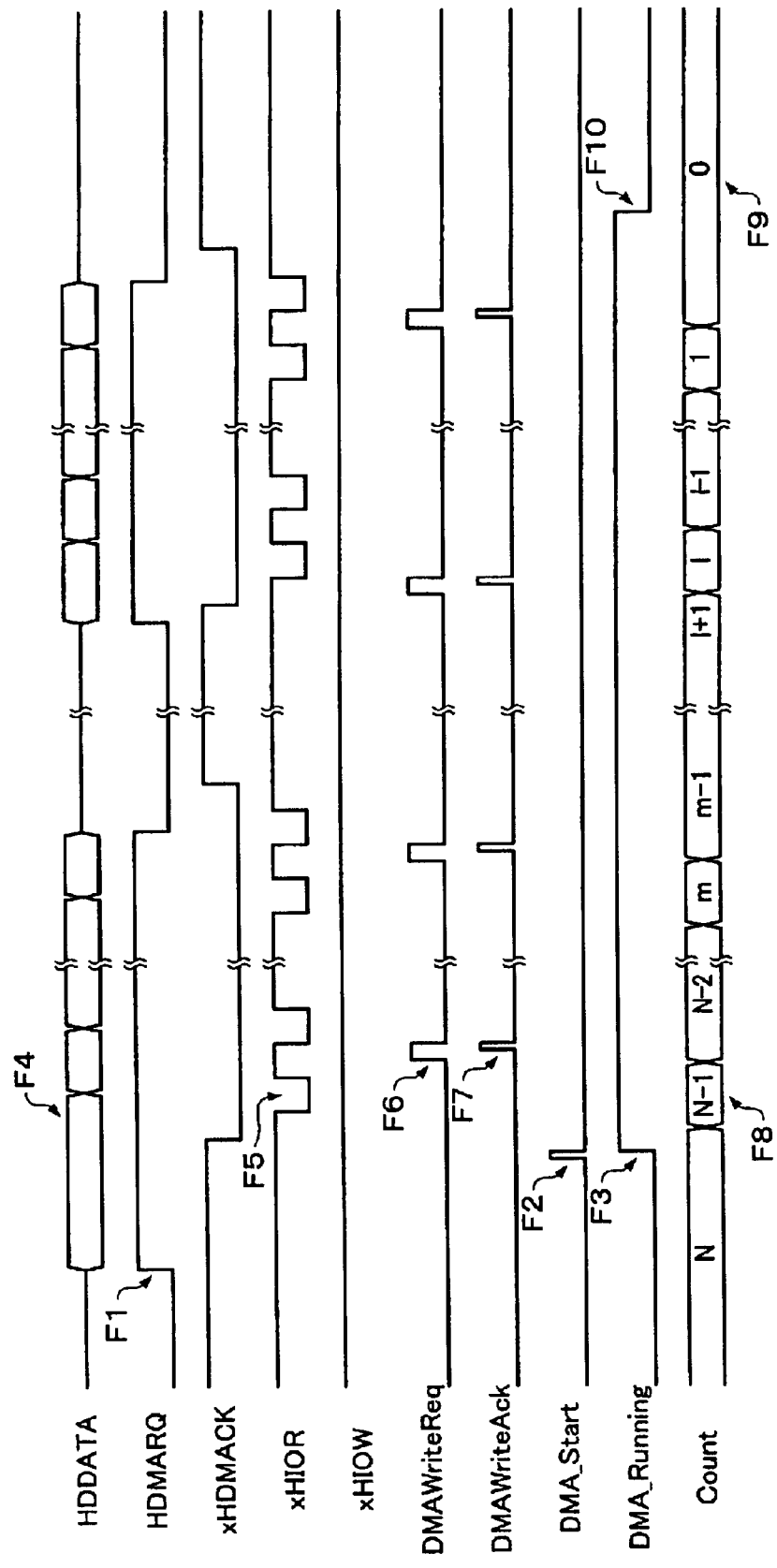
FIG. 11 is a timing waveform chart illustrative of DMA transfer during reception from an HDD.

A timing waveform chart shown in FIG. 11 relates to DMA transfer during data reception from a device such as a hard disk drive HDD.

If HDMARQ and DMA_Start become active, as shown at F1 and F2 in FIG. 11, DMA transfer begins and DMA_Running becomes active as shown at F3.

Data from the HDD is then received through EBUS, using read pulse signal XHIOR, as shown at F4 and F5. The thus-received data is written to data storage area 62 of the buffer 60 by handshaking using DMAWriteReq and DMAWriteAck, as shown at F6 and F7.

Every time data is received, the Count (number of data transfers) is decremented, as shown at F8. When Count reaches 0 as shown at F9 and the transfer of all data through EBUS has ended, DMA_Running becomes inactive, as shown at f10.

2.4 Detection of End of Data Phase (Data Transport)

Under USB, it is necessary to ensure that the phases on the host side and the device side are always coordinated during data transfer, as previously described with reference to FIGS. 5A and 5B.

Assume that the host in FIG. 5B has determined that the current phase is the data phase, whereas the device has determined that the current phase is the status phase, by way of example. If that happens, the IN token (the token at B4 in FIG. 5B) transferred from the host will be recognized erroneously as an IN token with respect to the CSW (B6), which could cause a data transfer error.

With the Bulk-Only specification of FIG. 2B, several types of information are allocated as information to be transferred through one end point. More specifically, a CBW (command) and OUT data are allocated as information to be transferred through the bulk-out end point EP1, and a CSW (status) and IN data are allocated as information to be transferred through the bulk-in end point EP2. The host and device must therefore distinguish which type of information is to be transferred through each of the end points. With the Bulk-Only specification, the host and the device determine what phase is the current phase and also distinguish this information.

Since the current phase is the command phase at B1 and B2 of FIGS. 5A and 5B, by way of example, it is determined that the information to be transferred through the end point EP1 is a CBW. Since the current phase is the data phase at B3 and B4, it is determined that the information to be transferred through the end point EP1 is OUT data and the information to be transferred through the end point EP2 is IN data. Furthermore, since the current phase is the status phase at B5 and B6, it is determined that the information to be transferred through the end point EP2 is a CSW.

Under USB, it is necessary that both the host and the device accurately recognize which phase is the current phase. It is therefore desirable to enable accurate determination, even during the timing of a switch from the data phase to the status phase, by way of example.

With this embodiment, the determination of the switch from the data phase to the status phase, in other words, the determination of the end of the data phase, is implemented by the method described below.

Figure 12:
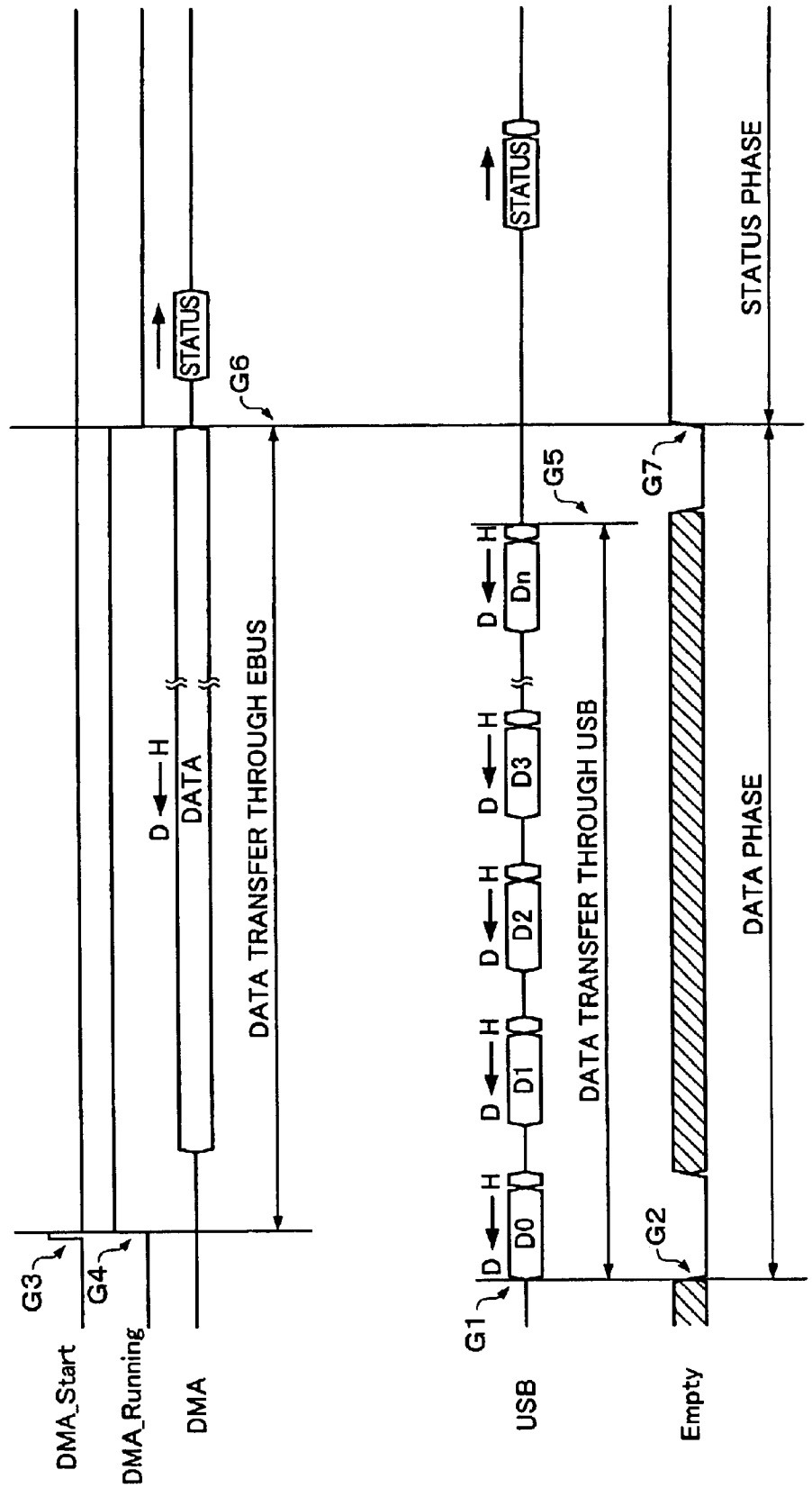
FIG. 12 is a timing waveform chart illustrative of the operation of one embodiment of the present invention during an OUT transaction (data transfer in a first direction)

For an OUT transaction (data transfer in a first direction) in which OUT data is transferred from the host to the device, by way of example, the end of the data phase (the end of all data transfer and the switching of phases) is determined as shown in FIG. 12.

More specifically, the data transfer (data phase) through USB (the first bus) starts as shown at G1 in FIG. 12. When the thus-transferred data is written into the data storage area 62 of the buffer 60, the Empty signal that indicates whether or not the data storage area 62 is empty becomes inactive as shown at G2, to indicate that the data storage area 62 is not empty.

The CPU then makes DMA_Running go active by setting DMA_Start to active, as shown at G3 and G4, and data transfer (EBUS data phase) through EBUS (the second bus) starts.

When data transfer through USB ends at G5 and data transfer (DMA transfer) through EBUS ends at G6, the data phase ends and it is determined that there is a switch from the data phase to the status phase.

The timing of G6 is delayed until after the timing of G5, which ends the USB data transfer. This G6 timing also matches the timing at G7 at which the Empty signal goes active because the data storage area 62 of the buffer 60 is empty.

With this embodiment, the timing of G6 is determined by using the DMA counter 82 of FIG. 12, which is provided on the EBUS side, to count the data size (number of transfers and data length) (see E9 in FIG. 10).

With this embodiment, the end of the data phase is determined by the condition that data transmission through EBUS (second bus) has ended during an OUT transaction (data transfer in the first direction).

Figure 13:
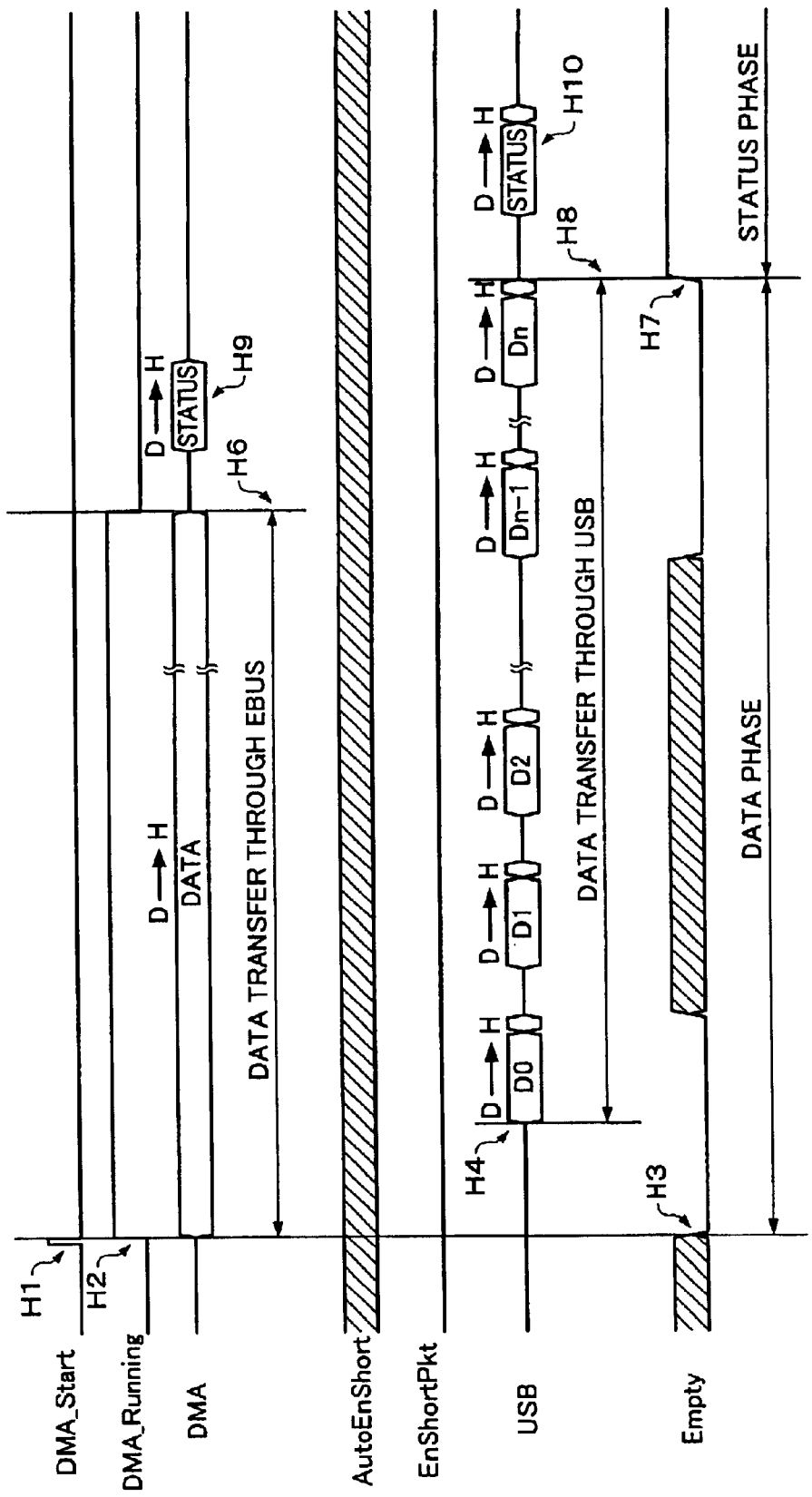
FIG. 13 is a timing waveform chart illustrative of the operation of one embodiment of the present invention during an IN transaction (data transfer in a second direction)

For an IN transaction (data transfer in the second direction), in which IN data is transferred from device to the host, on the other hand, the end of the data phase (the end of all data transfer and the switching of phases) is determined as shown in FIG. 13.

More specifically, DMA_Running goes active and the data transfer through EBUS starts when the CPU sets DMA_Start to active, as shown at H1 and H2. If the data that has been transferred through EBUS is written into the data storage area 62 of the buffer 60, Empty becomes inactive as shown at H3, to indicate that the data storage area 62 is not empty.

Data transfer by USB then starts, as shown at H4. The data to be transferred by USB is read from the data storage area 62, and Empty becomes active if the data storage area 62 becomes empty.

With this embodiment, after it has been determined that data transfer through EBUS (the second bus) has ended, as shown at H6, it is determined that the data phase (transfer of all the data) has ended at the timing at which the data storage area 62 becomes empty and the Empty signal becomes active, as shown at H7. In this case, the timing of H6 can be determined by using the DMA counter 82 provided on the EBUS side to count the size of data transferred by EBUS. The timing of H7 matches the timing of H8 at the end of data transfer (data phase) through USB (the first bus).

With this embodiment configured as described above, the end of the data phase during an IN transaction (data transfer in the second direction) is determined on condition that data reception through the EBUS (second bus) has ended and also the data storage area of the buffer 60 has become empty.

Another method that could be considered, by way of example, differs from the method of this embodiment shown in FIGS. 12 and 13 n that both the EBUS side and the USB side are provided with counters for counting the data size. With such a method, the end of the data phase during an OUT transaction is determined on condition that the count of the counter on the EBUS side has reached 0, whereas the end of the data phase during an IN transaction is determined on condition that the count of the counter on the USB side has reached 0, by way of example.

However, this method necessitates the provision of two counters, and the processing for controlling those two timers becomes involved. As a result, the circuit control and circuit configuration become complicated, leading to increases in the size and cost of the resultant data transfer control device. The processing of the firmware (CPU) that controls the data transfer control device also becomes complicated, and there is a danger of a deterioration of effective data transfer speed due to such processing overheads.

In contrast thereto, the method of this embodiment shown in FIGS. 12 and 13 need only provide a counter on the EBUS (second bus) side, as shown in FIG. 7, making it unnecessary to provide a counter on the USB (first bus) side. It is therefore possible to simplify the circuit control and also simplify the circuit configuration, making the data transfer control device more compact and inexpensive. The firmware processing for controlling the data transfer control device can also be simplified, enabling an increase in the effective data transfer speed.

Note that if data reception through EBUS (the second bus) ends with this embodiment, as shown at H9 in FIG. 13, the status of that data reception is acquired from the hard disk drive HDD side and generation of the CSW (status) shown in FIG. 4 is based on the thus-acquired status. This CSW generation processing could be done by the firmware, by way of example.

The thus-generated CSW is transmitted to the host side through USB (the first bus) in the status phase after the end of the data phase, as shown at H10 in FIG. 13.

This makes it possible to efficiently utilize the period during which data transfer is occurring through USB, to acquire the status from the HDD side and generate the CSW, as shown at H9 in FIG. 13. After the transition from the data phase to the status phase, it is possible to return a CSW immediately with respect to an IN token from the host, as shown at H10. It is therefore possible to reduce the frequency with which NAK is returned in answer to IN tokens from the host, thus increasing the effective data transfer speed.

2.5 Automatic Transmission of Short Packet

Under USB, a short packet has a special meaning as a payload size that is less than the maximum packet size.

In other words, if a short packet comes in from the device, the host determines that is the end of the data phase and moves on to the status phase. The device therefore controls data transfer to ensure that no short packet is sent to the host, except when the data phase is to end.

More specifically, the device always checks the size of data remaining in the data storage area 62 of the buffer 60. If the residual data size is greater than or equal to maximum packet size, a data packet of the maximum packet size is created from the residual data, for transfer to the host. If it is determined that the residual data size is less than the maximum packet size, it permits the transfer of a short packet and sends a packet of that residual data size as a short packet to the host. This enables the end of the data phase.

However, if the size of data remaining in the data storage area 62 is always checked in this manner and the processing is adjusted in accordance with the result of that check, it could happen that the processing load on the firmware (CPU) performing this check processing would become extremely heavy. In addition, this could lead to a situation in which these overheads of the firmware processing could cause a deterioration in the effective data transfer.

That is why this embodiment utilizes a method whereby a short packet in the data storage area 62 is transmitted automatically (by hardware processing, not by firmware processing) through the USB (first bus), if data reception (DMA transfer) through EBUS (the second bus) has ended and also the size of data remaining in the data storage area 62 (valid data) is less than the maximum packet size.

Figure 14:
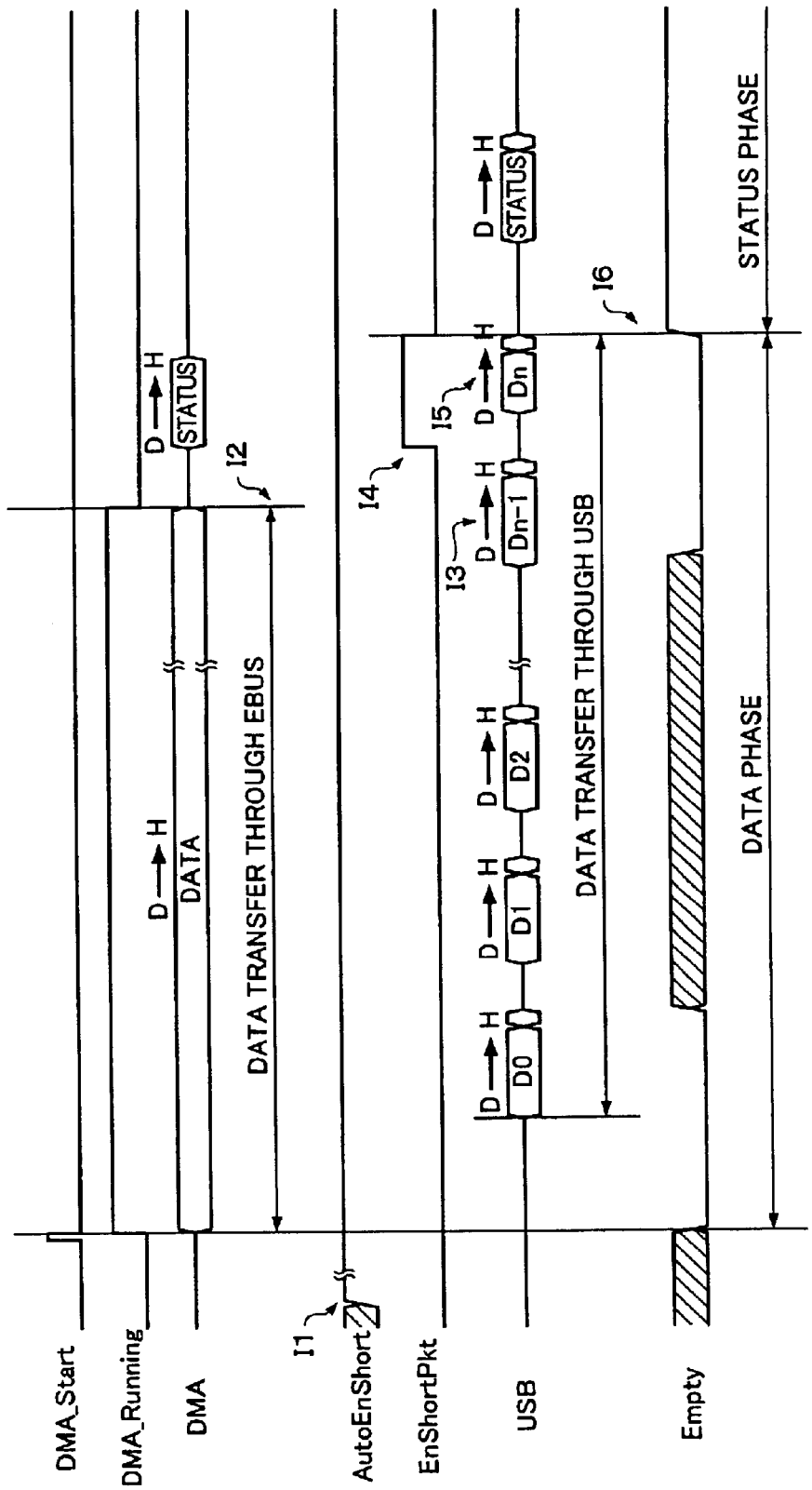
FIG. 14 is a timing waveform chart illustrative of a method of automatically transmitting a short packet.

A timing waveform chart shown in FIG. 14 illustrates a case in which the size of data remaining in the data storage area 62 is less than the maximum packet size during an IN transaction (data transfer in the second direction), by way of example.

In FIG. 14, an AutoEnShort signal (see FIG. 7) which sets the automatic transmission of a short packet (automatic transfer) to either enabled or disabled is set to be active (high), as shown at I1. The level of AutoEnShort is set by the firmware (CPU) writing a given value to an AutoEnShort register during enumeration. In this case, AutoEnShort could be set to be always active for a device in which the automatic transmission of short packet would always be valid, such as a mass storage device.

Assume that data transfer through EBUS ends, as shown at I2, in the state in which AutoEnShort has been set to active, as shown at I1 in FIG. 14, and a final packet Dn-1 of the maximum packet size (such as 512 bytes) is to be transferred, as shown at I3.

In this case, if the size of data remaining in the data storage area 62 is less than the maximum packet size, EnShortPkt goes active as shown at I4 to indicate to the SIE 30 the automatic transmission of s short packet. In other words, EnShortPkt goes active when AutoEnShort is active and HaveMPS, which indicates whether or not the residual data size is the maximum packet size, is inactive.

When EnShortPkt goes active, the short packet that exists within the data storage area 62 is automatically transmitted to the host by the hardware (SIE 30), not through firmware processing, as shown at I5 in FIG. 14. When a short packet is transferred through USB, the data phase ends at I6 and the status phase starts.

In the method in accordance with this embodiment shown in FIG. 14, a short packet in the data storage area 62 can be transmitted automatically by the hardware by setting AutoEnShort to active. It is therefore not necessary for the firmware to perform processing to check the size of data remaining in the data storage area 62. As a result, the processing load on the firmware can be reduced, enabling an increase in the effective data transfer speed.

It often happens that an inexpensive CPU that operates at a clock frequency of 20 to 50 MHz is used on the device side, from requirements of reduced cost. If the process of checking the residual data size is performed by the firmware operating on the CPU, therefore, it is possible that the timing of the transition to the status phase at I6 can be greatly delayed.

In contrast thereto, the method of this embodiment shown in FIG. 14 makes it possible to change to the status phase at an earlier stage, since the process of checking the residual data size is not performed by the firmware. As a result, the effective data transfer speed can be increased far more than in the case in which the process of checking the residual data size is performed by the firmware.

Note that it is possible with this embodiment to freely set whether the automatic transmission of a short packet is enabled or disabled, by changing the setting of AutoEnShort.

In a mass storage device such as a hard disk drive or CD drive where the automatic transmission of a short packet is always valid, for example, AutoEnShort is set to active. This makes it possible to transmit a short packet automatically and change to the status phase, without firmware processing.

With a device such as a scanner, on the other hand, where information such as data size is attached to data received through EBUS (the second bus), for transmission through USB (the first bus), AutoEnShort is set to inactive (low).

In other words, it is not possible to define the final data size with a scanner, until after the fetching of data is completed. The data transfer control device therefore attaches control information (header and footer) comprising data size after data has been received from the scanner, for transfer to the host. For that reason, the size of data transferred through EBUS does not match the size of data transferred through USB, so it is not possible to permit unconditionally transfer of a short packet to the host, and thus it is necessary to set AutoEnShort to inactive.

This embodiment therefore makes it possible to adjust flexibly to data transfer in devices such as scanners in addition to mass storage devices such as hard disk drives, by freely setting the automatic transmission of a short packet to enabled or disabled.

2.6 Notification of Presence of Short Packet

The AutoEnShort signal shown in FIG. 14 is used for automatic transmission of a short packet in the data storage area 62.

In contrast thereto, the CPU (firmware) could be notified of the presence of a short packet in the data storage area 62. More specifically, the configuration is such that an interrupt is used to notify the CPU (processing unit) of the presence of a short packet in the data storage area 62, if data reception through EBUS (the second bus) ends and also the size of data remaining in the data storage area 62 is less than the maximum packet size.

Figure 15:
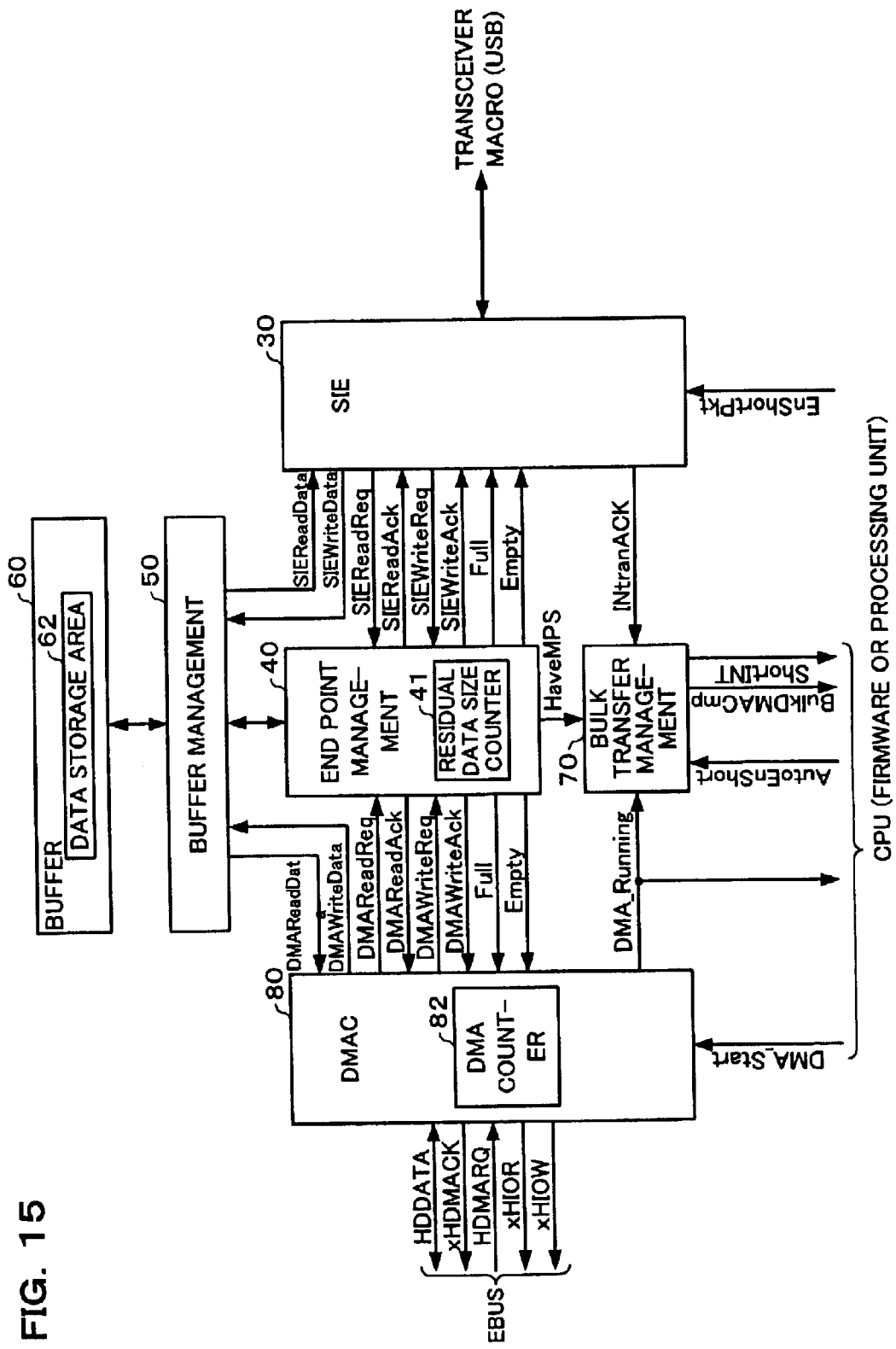
FIG. 15 is another detailed connection of the data transfer control device according to one embodiment of the present invention.

A detailed example of connections between the SIE 30, the end point management circuit 40, the buffer management circuit 50, the buffer 60, the bulk transfer management circuit 70, and the DMAC 80 when such a method is used is shown in FIG. 15.

FIG. 15 differs from the previously described FIG. 7 in that the bulk transfer management circuit 70 outputs an interrupt signal ShortINT to the CPU (a register that can be accessed by the CPU) and EnShortPkt is set by the CPU and input to the SIE 30.

In this case, ShortINT is an interrupt signal for notifying the CPU of the presence of a short packet in the data storage area 62, and EnShortPkt is a signal that indicates to the SIE 30 the transfer of the short packet by the CPU.

If HaveMPS becomes inactive (less than the maximum packet size) after DMA_Running becomes inactive (data reception end), by way of example, ShortINT becomes active to notify the CPU of the presence in the data storage area 62 of a short packet that can be transferred.

When that happens, the CPU performs determination processing for transferring the short packet and, if it is determined that a short packet can be transferred, it sets EnShortPkt to active. This causes the SIE 30 to read the short packet that is in the data storage area 62 and perform processing to transfer it through USB to the host.

A timing waveform chart of FIG. 16 shows the operation during an IN transaction (data transfer in the second direction) when size of data remaining in the data storage area 62 is less than the maximum packet size.

In FIG. 16, AutoEnShort, which sets whether the automatic transmission of a short packet is enabled or disabled, becomes inactive (low) at J1. In this state, data transfer through EBUS ends at J2 and the final packet Dn-1 of the maximum packet size is transferred by USB at J3.

If the size of data remaining in the data storage area 62 is less than the maximum packet size in such a case, the interrupt signal ShortINT goes active to inform the CPU of the presence of the short packet, as shown at J4. In other words, ShortINT goes active when DMA_Running is inactive and HaveMPS, which indicates whether or not the residual data size is the maximum packet size, is inactive.

When this happens, the CPU (firmware) that has received this ShortINT performs processing to attach information such as data size to the received data (processing to write the attached information to the data storage area 62). EnShortPkt then goes active, as shown at J5. This causes the transfer of the data in the data storage area 62 to the host by the SIE 30, as shown at J6. The data phase then ends and the status phase starts, as shown at J7.

In the method of this embodiment shown in FIG. 16, ShortINT is used to notify the firmware operating on the CPU of the presence of the short packet in the data storage area 62. This makes it possible to implement suitable data transfer, even in a device such as a scanner, in which information such as data size is finally added to received data.

2.7 Firmware Processing

A flowchart of the processing performed by the firmware of a comparative example during an IN transaction is shown in FIG. 17A. Similarly, a flowchart of the processing performed by the firmware in accordance with the method of this embodiment, which automatically transmits a short packet, is shown in FIG. 17B.

In the comparative example of FIG. 17A, the firmware first sets DMA_Start to 1 (high), to cause the start of DMA transfer through the EBUS (step S1). It then checks DMA_Running to determine whether or not DMA transfer through the EBUS has ended (step S2).

If it has been determined that DMA transfer has ended, the firmware uses IntranACK to detect ACK from the USB side (step S3). If ACK has been detected, the firmware checks the residual data size RDS in the data storage area of the buffer (step S4). If RDS is greater than or equal to the maximum packet size MaxPacketSize, the flow returns to step S3 to wait for the arrival of the next ACK.

If RDS is less than MaxPacketSize, on the other hand, EnShortPkt is set to 1 (step S5). This causes the transfer of a short packet from the data storage area to the host. The flow then returns to step S3, to wait for the next ACK.

If RDS is 0, it is considered that all of the data in the data storage area has been transferred, so the firmware acquires the EBUS-side status (step S6). The firmware generates the CSW on the basis of the thus-acquired status, and sets the status to be sent to the USB side (step S7).

In this embodiment shown in FIG. 17B, the firmware first sets DMA_Start to 1, to cause the start of DMA transfer through the EBUS (step S11). Note that AutoEnShort is set to 1 before the DMA transfer. The firmware checks DMA_Running to determine whether or not DMA transfer through the EBUS has ended (step S12).

If it has been determined that DMA transfer has ended (I2 in FIG. 14), the firmware acquires the EBUS-side status (step S13). The firmware then determines whether or not the data phase (transfer of all the data) has ended (step S14). In other words, it determines whether or not the data storage area of the buffer area has become empty and the ACK referring to the final packet has been returned from the host. If it has been determined that the data phase has ended, the firmware generates the CSW on the basis of the status acquired in step S13, and sets the status to be sent to the USB side (step S15).

In this manner, the processing for checking the residual data size (step S4) that is necessary with the comparative example of FIG. 17A is not necessary with the embodiment of FIG. 17B. The processing for setting EnShortPkt to active is also done by hardware, so there's no need to have the firmware do it. It is therefore possible to reduce the processing load on the firmware, thus increasing the effective data transfer speed.

Figure 18:
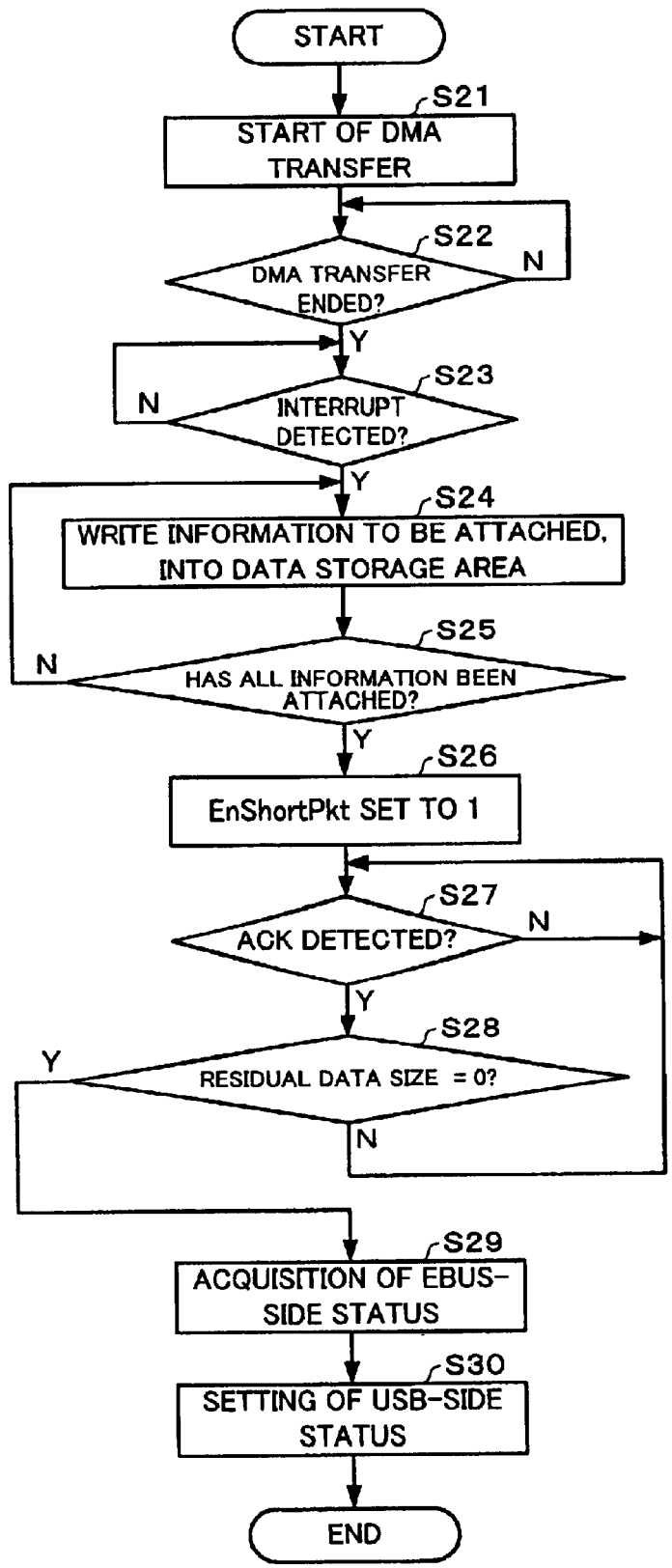
FIG. 18 is a flowchart of firmware processing during the method of notifying the firmware of the presence of a short packet.

A flowchart shown in FIG. 18 is of the processing performed by the firmware in the method of using an interrupt to notify the firmware of the presence of a short packet (FIGS. 15 and 16).

In FIG. 18, the firmware first causes the start of DMA transfer by EBUS, then it determines whether or not DMA transfer has ended (steps S21 and S22).

If it has been determined that DMA transfer has ended, the firmware determines whether or not the interrupt signal ShortINT has been detected (at J4 in FIG. 16) (step S23). If ShortINT has been detected, the firmware writes to the data storage area (FIFO) the information that is to be attached to the receive data of the DMA transfer (such as the data size) (step S24).

If it is determined that all of the information has been attached (step S25), the firmware sets EnShortPkt to 1 (step S26).

It then detects ACK from the USB side (step S27). If ACK has been detected, the firmware checks whether or not the residual data size RDS in the data storage area is 0 (step S28). If RDS is not 0, the flow returns to step S27 and the firmware waits for the next ACK to be detected.

If RDS is 0, on the other hand, it is considered that all of the data in the data storage area has been transferred, so the firmware acquires the EBUS-side status (step S29). The firmware generates the CSW on the basis of the thus-acquired status, and sets the status to be sent to the USB side (step S30).

3. Electronic Equipment

The description now turns to examples of electronic equipment comprising the data transfer control device of this embodiment of the invention.

Figure 19A:
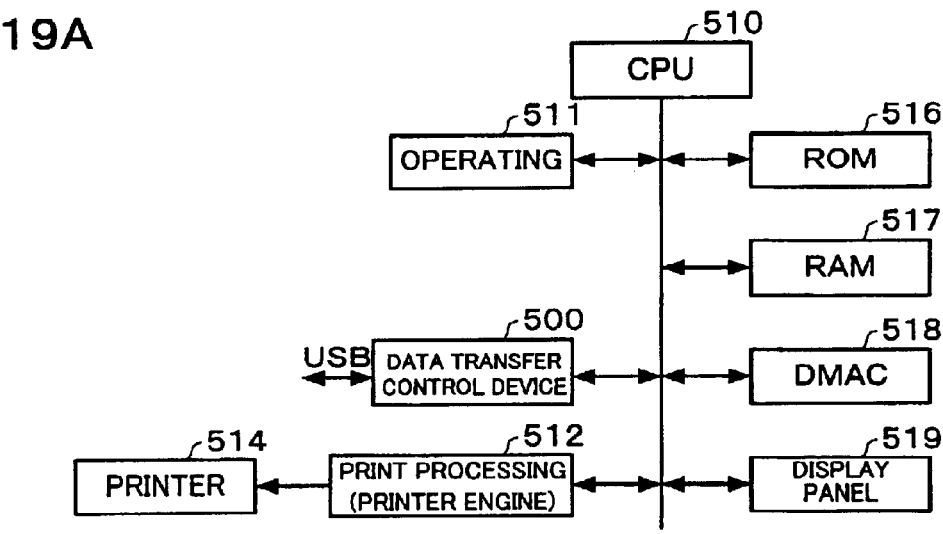
FIGS. 19A, 19B, and 19C are internal block diagrams of various items of electronic equipment.
Figure 20A:
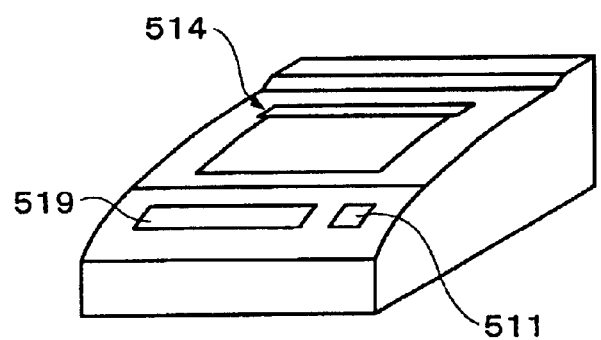
FIGS. 20A, 20B, and 20C show typical external views of various items of electronic equipment.

An internal block diagram of a printer that is one example of such electronic equipment is shown in FIG. 19A with an external view thereof being shown in FIG. 20A. A CPU (microcomputer) 510 has various functions, including that of controlling the entire system. An operating section 511 is designed to enable the user to operate the printer. Data such as a control program and fonts is stored in a ROM 516, and a RAM 517 functions as a work area for the CPU 510. A DMAC 518 is a DMA controller for transferring data through the CPU 510. A display panel 519 is designed to inform the user of the operational state of the printer.

Serial print data that has been send in from another device such as a personal computer via USB is converted into parallel print data by a data transfer control device 500. The thus converted parallel print data is sent to a print processing section (a printer engine) 512 by the CPU 510 or the DMAC 518. This parallel print data is subjected to given processing in the print processing section 512 and is output for printing to paper by a print section (a device for outputting data) 514 comprising components such as a print head.

Figure 19B:
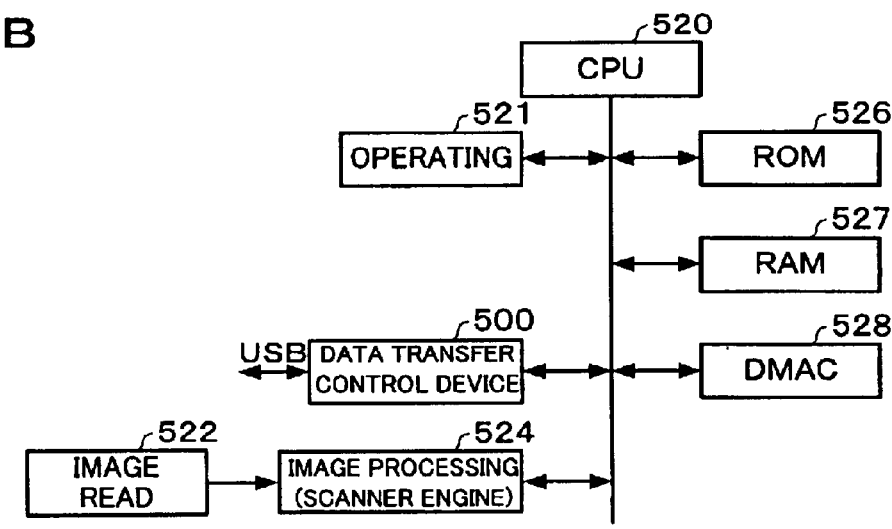
Figure 20B:
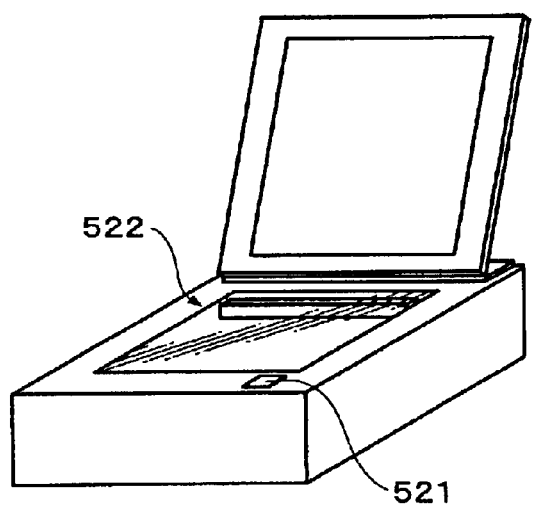

An internal block diagram of a scanner that is another example of electronic equipment is shown in FIG. 19B with an external view thereof being shown in FIG. 20B. A CPU 520 has various functions, including that of controlling the entire system. An operating section 521 is designed to enable the user to operate the scanner. Data such as a control program is stored in a ROM 526, and a RAM 527 functions as a work area for the CPU 520. A DMAC 528 is a DMA controller.

An image of a document is read in by an image read section (a device for fetching data) 522, which comprises components such as a light source and an opto-electric converter, and data of the read-in image is processed by an image processing section (a scanner engine) 524. The processed image data is sent to the data transfer control device 500 by the CPU 520 or DMAC 528. The data transfer control device 500 converts that parallel image data into serial data and sends it to another device such as a personal computer via USB.

Figure 19C:
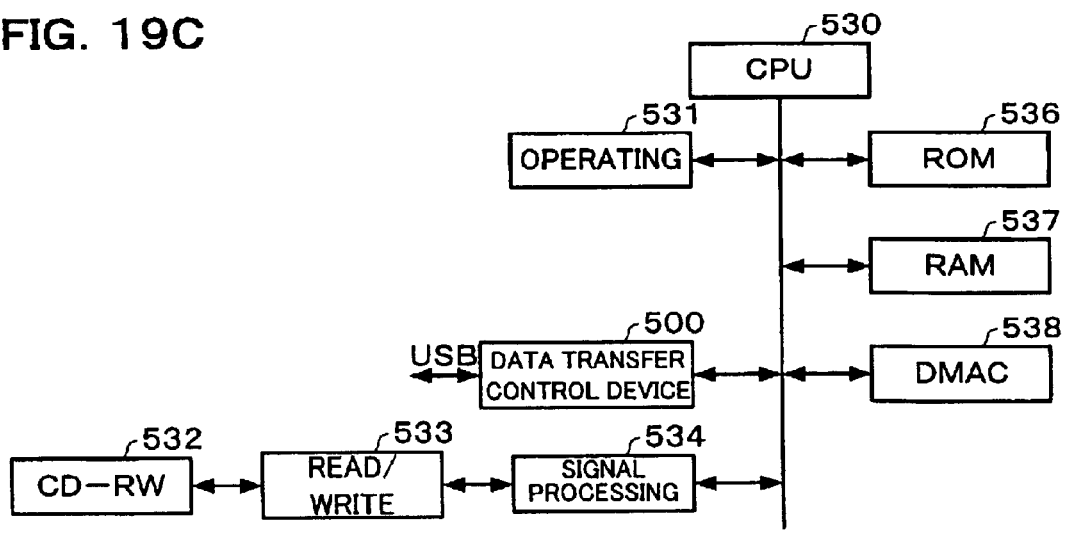
Figure 20C:
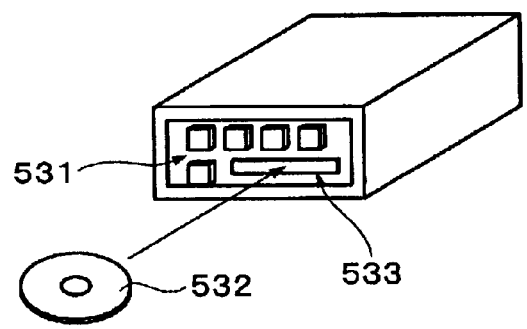

An internal block diagram of a CD-RW drive that is a further example of electronic equipment is shown in FIG. 19C with an external view thereof being shown in FIG. 20C. A CPU 530 has various functions, including that of controlling the entire system. An operating section 531 is designed to enable the user to operate the CD-RW drive. Data such as a control program is stored in a ROM 536, and a RAM 537 functions as a work area for the CPU 530. A DMAC 538 is a DMA controller.

Data read out from a CD-RW 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent to the data transfer control device 500 by the CPU 530 or the DMAC 538. The data transfer control device 500 converts this parallel data into serial data, then sends it to another device such as a personal computer via USB.

Serial data that comes in from another device via USB, on the other hand, is converted into parallel data by the data transfer control device 500. This parallel data is sent to the signal processing section 534 by the CPU 530 or the DMAC 538. This parallel print data is subjected to given signal processing by the signal processing section 534 then is stored by the read/write section 533 on the CD-RW 532.

Note that a separate CPU for controlling data transfer by the data transfer control device 500 could be provided in addition to the CPU 510, 520, or 530 of FIG. 19A, FIG. 19B, FIG. 19C.

Use of the data transfer control device of this embodiment in electronic equipment reduces the processing load on the firmware operating on the CPU, thus making it possible to use an inexpensive CPU. Furthermore, since it is possible to reduce the cost and the scale of the data transfer control device, it is possible to aim for a reduction in the cost and scale of the electronic equipment.

Use of the data transfer control device of this embodiment of the present invention in electronic equipment makes it possible to transfer data in the HS mode laid down by USB 2.0. When a user uses a personal computer or the like to specify a printout, it is therefore possible to complete printing with only a small time lag. Similarly, the user can view an image that is read in with only a small time lag after a scanner has been instructed to fetch the image. It also makes it possible to read data from a CD-RW and write data to a CD-RW at high speed.

Note that the electronic equipment that can employ a data transfer control device in accordance with the present invention is not limited to the above described embodiment, and thus various other examples can be considered, such as various types of optical disk drive (CD-ROM or DVD), magneto-optical (MO) disk drives, hard disk drives, TVs, VCRs, video cameras, audio equipment, telephones, projectors, personal computers, electronic organizers, and dedicated wordprocessors.

Note also that the present invention is not limited to the embodiment described herein, and various modifications are possible within the scope of the invention as laid out hereunder.

For example, the configuration of the data transfer control device in accordance with the present invention is not limited to that shown in FIGS. 6, 7, and 15, and thus various modifications thereof are possible.

This embodiment has been described with reference to an example in which the present invention was applied to the USB Bulk-Only specification, but the application of the present invention is not limited to the USB Bulk-Only specification.

In addition, it is particularly desirable to apply the present invention to data transfer under USB 2.0, but the present invention is not limited thereto. For example, the present invention can also be applied to data transfer in accordance with a standard that is based on a concept similar to that of USB 2.0, or a standard that is developed from USB 2.0.

What is claimed is:

1. A data transfer control device for data transfer through a bus, comprising:

a buffer having a data storage area for storing data that is received through a first bus and transmitted through a second bus during data transfer in a first direction, and for storing data that is received through the second bus and transmitted through the first bus during data transfer in a second direction;

a packet handler circuit which separates data to be stored in the data storage area from a packet received through the first bus during data transfer in the first direction, the packet handler circuit generating a packet from data stored in the data storage area during data transfer in the second direction; and a buffer management circuit which manages the writing of data into the data storage area of the buffer and the reading of data from the data storage area, wherein the end of a data phase for the transfer of data during the data transfer in the first direction is determined on condition that data transmission through the second bus has ended; and wherein the end of a data phase for the transfer of data during the data transfer in the second direction is determined on condition that data reception through the second bus has ended and also the data storage area of the buffer has become empty.

2. The data transfer control device as defined in claim 1; further comprising:

a counter which counts the size of data transmitted or received through the second bus.

3. The data transfer control device as defined in claim 1, wherein the status of the data reception through the second bus is acquired; and wherein the thus-acquired status is transmitted though the first bus during a status phase after the end of the data phase.

4. The data transfer control device as defined in claim 1, wherein a short packet in the data storage area is automatically transmitted through the first bus, when data reception through the second bus ends and also the size of data remaining in the data storage area of the buffer is less than the maximum packet size.

5. The data transfer control device as defined in claim 1, wherein a processing unit is notified of the presence of a short packet in the data storage area, when data reception through the second bus ends and also the size of data remaining in the data storage area of the buffer is less than the maximum packet size.

6. The data transfer control device as defined in claim 4, further comprising:

a unit which sets the automatic transmission of a short packet from the data storage area to either enabled or disabled.

7. The data transfer control device as defined in claim 6, wherein the automatic transmission is set to be disabled when data that has been received through the second bus has given information and is transmitted through the first bus.

8. The data transfer control device as defined in claim 1, wherein information that has been input first to the data storage area is output first from the data storage area.

9. The data transfer control device as defined in claim 1, wherein data transfer is in accordance with the universal serial bus (USB) standard.

10. A data transfer control device for data transfer through a bus, comprising:

a buffer having a data storage area for storing data that is received through a second bus and transmitted through a first bus;

a packet handler circuit which separates data to be stored in the data storage area from a packet received through the first bus during data transfer in the first direction, the packet handler circuit generating a packet from data stored in the data storage area during data transfer in the second direction; and a buffer management circuit which manages the writing of data into the data storage area of the buffer and the reading of data from the data storage area, wherein a short packet in the data storage area is automatically transmitted through the first bus, when data reception through the second bus ends and also the size of data remaining in the data storage area of the buffer is less than the maximum packet size.

11. The data transfer control device as defined in claim 10, further comprising:

a unit which sets the automatic transmission of a short packet from the data storage area to either enabled or disabled.

12. The data transfer control device as defined in claim 11, wherein the automatic transmission is set to be disabled when data that has been received through the second bus has given information and is transmitted through the first bus.

13. The data transfer control device as defined in claim 10, wherein information that has been input first to the data storage area is output first from the data storage area.

14. The data transfer control device as defined in claim 10, wherein data transfer is in accordance with the universal serial bus (USB) standard.

15. A data transfer control device for data transfer through a bus, comprising:

a buffer having a data storage area for storing data that is received through a second bus and transmitted through a first bus;

a packet handler circuit which separates data to be stored in the data storage area from a packet received through the first bus during data transfer in the first direction, the packet handler circuit generating a packet from data stored in the data storage area during data transfer in the second direction; and a buffer management circuit which manages the writing of data into the data storage area of the buffer and the reading of data from the data storage area, wherein a processing unit is notified of the presence of a short packet in the data storage area, when data reception through the second bus ends and also the size of data remaining in the data storage area of the buffer is less than the maximum packet size.

16. The data transfer control device as defined in claim 15, wherein information that has been input first to the data storage area is output first from the data storage area.

17. The data transfer control device as defined in claim 15, wherein data transfer is in accordance with the universal serial bus (USB) standard.

18. Electronic equipment comprising:

the data transfer control device as defined claim 1; and a device which performs output processing, fetch processing, or storage processing on data transferred through the data transfer control device and the bus.

19. Electronic equipment comprising:

the data transfer control device as defined claim 10; and a device which performs output processing, fetch processing, or storage processing on data transferred through the data transfer control device and the bus.

20. Electronic equipment comprising:

the data transfer control device as defined claim 15; and a device which performs output processing, fetch processing, or storage processing on data transferred through the data transfer control device and the bus.

21. A data transfer control method for data transfer through a bus, comprising:

providing a data storage area on a buffer for storing data that is received through a first bus and transmitted through a second bus during data transfer in a first direction, and for storing data that is received through a second bus and transmitted through a first bus during data transfer in a second direction;

separating data to be stored in the data storage area from a packet received through the first bus during data transfer in the first direction and generating a packet from data stored in the data storage area during data transfer in the second direction;

managing the writing of data into the data storage area of the buffer and the reading of data from the data storage area;

determining the end of a data phase for the transfer of data during the data transfer in the first direction on condition that data transmission through the second bus has ended; and determining the end of a data phase for the transfer of data during the data transfer in the second direction on condition that data reception through the second bus has ended and also the data storage area of the buffer has become empty.

22. A data transfer control method for data transfer through a bus, comprising:

providing a data storage area on a buffer for storing data that is received through a second bus and transmitted through a first bus;

separating data to be stored in the data storage area from a packet received through the first bus during data transfer in a first direction and generating a packet from data stored in the data storage area during data transfer in a second direction;

managing the writing of data into the data storage area of the buffer and the reading of data from the data storage area; and automatically transmitting a short packet in the data storage area through the first bus, when data reception through the second bus ends and also the size of data remaining in the data storage area of the buffer is less than the maximum packet size.

23. A data transfer control method for data transfer through a bus, comprising:

providing a data storage area on a buffer for storing data that is received through a second bus and transmitted through a first bus;

separating data to be stored in the data storage area from a packet received through the first bus during data transfer in a first direction and generating a packet from data stored in the data storage area during data transfer in a second direction;

managing the writing of data into the data storage area of the buffer and the reading of data from the data storage area; and causing a processing unit to be notified of the presence of a short packet in the data storage area, when data reception through the second bus ends and also the size of data remaining in the data storage area of the buffer is less than the maximum packet size.

\* \* \* \* \*